United States Patent
Bieganski et al.

(10) Patent No.: US 6,412,012 B1
(45) Date of Patent: Jun. 25, 2002

(54) SYSTEM, METHOD, AND ARTICLE OF MANUFACTURE FOR MAKING A COMPATIBILITY-AWARE RECOMMENDATIONS TO A USER

(75) Inventors: Paul Bieganski, Eden Prairie; Joseph Konstan, St. Paul; John Rauser; Dan Frankowski, both of Minneapolis, all of MN (US)

(73) Assignee: Net Perceptions, Inc., Edina, MN (US)

( * ) Notice: Subject to any disclaimer, the term of this patent is extended or adjusted under 35 U.S.C. 154(b) by 0 days.

(21) Appl. No.: 09/219,585

(22) Filed: Dec. 23, 1998

(51) Int. Cl.⁷ .............................................. G06F 13/00
(52) U.S. Cl. ........................................ 709/232; 710/62
(58) Field of Search ................................ 709/232–234; 705/26–27, 10; 235/383; 395/200.49; 710/62

(56) References Cited

U.S. PATENT DOCUMENTS

| | | | |
|---|---|---|---|
| 4,996,642 A | 2/1991 | Hey ............................. | 364/419 |
| 5,201,010 A | 4/1993 | Deaton et al. .................. | 382/7 |
| 5,311,424 A | 5/1994 | Mukherjee et al. ......... | 364/401 |
| 5,353,219 A | 10/1994 | Mueller et al. ............. | 364/405 |
| 5,383,111 A | 1/1995 | Homma et al. ............. | 364/401 |
| 5,459,306 A * | 10/1995 | Stein et al. .................. | 235/383 |
| 5,515,269 A | 5/1996 | Willis et al. ................ | 364/401 |
| 5,704,017 A * | 12/1997 | Heckerman et al. .......... | 706/12 |
| 5,749,081 A | 5/1998 | Whiteis ...................... | 707/102 |
| 5,768,142 A | 6/1998 | Jacobs .................... | 364/479.01 |
| 5,774,868 A | 6/1998 | Cragun et al. ................ | 705/10 |
| 5,794,209 A | 8/1998 | Agrawal et al. .............. | 705/10 |
| 5,825,651 A | 10/1998 | Gupta et al. ........... | 364/468.09 |
| 5,842,199 A | 11/1998 | Miller et al. .................... | 707/2 |
| 5,867,799 A | 2/1999 | Lang et al. ..................... | 707/1 |
| 5,974,396 A | 10/1999 | Anderson et al. ............. | 705/10 |
| 6,006,218 A | 12/1999 | Breese et al. ................... | 707/3 |
| 6,016,475 A | 1/2000 | Miller et al. .................... | 705/1 |
| 6,018,738 A | 1/2000 | Breese et al. ................ | 707/100 |
| 6,041,311 A * | 3/2000 | Chislenko et al. ............ | 705/27 |
| 6,049,777 A | 4/2000 | Sheena et al. ................. | 705/10 |
| 6,064,980 A | 5/2000 | Jacobi et al. .................. | 705/26 |
| 6,092,049 A | 7/2000 | Chislenko et al. ............ | 705/10 |
| 6,108,493 A * | 8/2000 | Miller et al. ........... | 395/200.49 |
| 6,112,186 A * | 8/2000 | Bergh et al. .................. | 705/10 |
| 6,119,101 A * | 9/2000 | Peckover ..................... | 705/26 |

FOREIGN PATENT DOCUMENTS

| | | |
|---|---|---|
| EP | 0 643 359 A2 | 5/1994 |
| EP | 0 643 359 A2 | 3/1995 |

(List continued on next page.)

OTHER PUBLICATIONS

Avery, C. et al., "Recommender Systems for Evaluating Computer Messages", *Communications of the ACM*, 40(3):88–89 (Mar. 1997).

(List continued on next page.)

*Primary Examiner*—David Wiley
(74) *Attorney, Agent, or Firm*—Finnegan, Henderson, Farabow, Garrett & Dunner, L.L.P.

(57) ABSTRACT

A recommendation process includes the consideration of the compatibility of the items being recommended. An electronic processing system for generating a compatibility-aware recommendation output set to a is user based, at least in part, on a set of item compatibility rules. The system includes a processing system of one or more processors configured to receive applicable data, including i) user preference data, and ii) item compatibility rules, and to produce a compatibility-aware recommendation output set using the user preference data and the item compatibility rules. A method and computer-readable storage device containing the method are also presented.

42 Claims, 20 Drawing Sheets

FOREIGN PATENT DOCUMENTS

| | | |
|---|---|---|
| EP | 0751471 | 1/1997 |
| JP | 7-152771 | 6/1995 |
| JP | 7-234881 | 9/1995 |
| JP | 8-331077 | 12/1996 |
| JP | 9-153027 | 6/1997 |
| JP | 9-265478 | 10/1997 |
| JP | 10-32797 | 2/1998 |
| JP | 10-63680 | 3/1998 |
| JP | 10-63681 | 3/1998 |
| JP | 10-63749 | 3/1998 |
| JP | 10-74206 | 3/1998 |
| JP | 10-91642 | 4/1998 |
| JP | 10-91647 | 4/1998 |
| JP | 10-91686 | 4/1998 |
| JP | 10-143540 | 5/1998 |
| JP | 10-143541 | 5/1998 |
| JP | 10-162025 | 6/1998 |
| JP | 10-162027 | 6/1998 |
| JP | 10-162028 | 6/1998 |
| JP | 10-198706 | 7/1998 |
| JP | 10-228482 | 8/1998 |
| JP | 10-228487 | 8/1998 |
| JP | 10-240749 | 9/1998 |
| JP | 10-247198 | 9/1998 |
| JP | 10-257405 | 9/1998 |
| JP | 10-260955 | 9/1998 |
| JP | 10-283403 | 10/1998 |
| JP | 10-289245 | 10/1998 |
| JP | 10-301950 | 11/1998 |
| JP | 10-307845 | 11/1998 |
| JP | 10-320415 | 12/1998 |
| JP | 10-340270 | 12/1998 |
| JP | 11-7453 | 1/1999 |
| JP | 11-7472 | 1/1999 |
| JP | 11-15840 | 1/1999 |
| JP | 11-45265 | 2/1999 |
| JP | 11-45284 | 2/1999 |
| JP | 11-45286 | 2/1999 |
| JP | 11-45289 | 2/1999 |
| JP | 11-45290 | 2/1999 |
| JP | 11-53394 | 2/1999 |
| JP | 11-66081 | 3/1999 |
| JP | 11-66097 | 3/1999 |
| JP | 11-66098 | 3/1999 |
| JP | 11-96164 | 4/1999 |
| JP | 11-110410 | 4/1999 |
| JP | 11-120189 | 4/1999 |
| JP | 11-134345 | 5/1999 |
| JP | 11-134361 | 5/1999 |
| JP | 11-143900 | 5/1999 |
| JP | 11-161670 | 6/1999 |
| JP | 11-164217 | 6/1999 |
| JP | 11-175546 | 7/1999 |
| JP | 11-184890 | 7/1999 |
| JP | 11-184891 | 7/1999 |
| JP | 11-195035 | 7/1999 |
| JP | 11-205706 | 7/1999 |
| JP | 11-212996 | 8/1999 |
| JP | 11-232278 | 8/1999 |
| JP | 11-232287 | 8/1999 |
| JP | 11-509019 | 8/1999 |
| JP | 11-250091 | 9/1999 |
| JP | 11-259497 | 9/1999 |
| JP | 11-272574 | 10/1999 |
| JP | 11-282874 | 10/1999 |
| JP | 11-282875 | 10/1999 |
| JP | 11-308547 | 11/1999 |
| JP | 11-312177 | 11/1999 |
| JP | 11-316759 | 11/1999 |
| JP | 11-328266 | 11/1999 |
| JP | 11-338869 | 12/1999 |
| JP | 11-338872 | 12/1999 |
| JP | 11-338879 | 12/1999 |
| JP | 11-345446 | 12/1999 |
| JP | 2000-13708 | 1/2000 |
| JP | 2000-23112 | 1/2000 |
| JP | 2000-48046 | 2/2000 |
| JP | 2000-57090 | 2/2000 |
| WO | WO 97/26729 | 7/1997 |
| WO | WO 98/02835 | 1/1998 |
| WO | WO 98/33135 | 7/1998 |

OTHER PUBLICATIONS

Balabonovic, M. et al., "Fab: Content–Based, Collaborative Recommendation", *Communications of the ACM*, 40(3):66–72 (Mar. 1997).

Borchers, A. et al., "Ganging up on Information Overload", *Computer*, pp. 106–108 (Apr. 1998).

Kautz, H. et al., "Referral Web: Combinig Social Networks and Collaborative Filtering", *Communications of the ACM*, 40(3):63–65 (Mar. 1997).

Konstan, J. et al., "GroupLens: Applying Collaborative Filtering to Usenet News", *Communications of the ACM*, 40(3):77–87 (Mar. 1997).

Miller, B. et al., "Experiences with GroupLens: Making Usenet Useful Again", *1997 Annual Technical Conference*, 219–233 (1997).

Resnick, P. et al., "GroupLens: An Open Architecture for Collaborative Filtering of Netnews", *Proceedings of the 1994 Computer Supported Collaborative Work Conference*, 13 pages (1994).

Resnick, P. et al., "Recommender Systems", *Communications of the ACM*, 40(3):56–58 (Mar. 1997).

Rucker, J. et al., "Siteseer: Personalized Navigation for the Web", *Communications of the ACM*, 40(3):73–76 (Mar. 1997).

Shardanand, U. et al., "Social Information Filtering: Algorithms for Automating 'Word of Mouth'", *Chi '95 Conference Proceedings on Human Factors in Computing Systems*, 210–216 (May 7–11, 1995).

Terveen, L. et al., "Phoaks: A System for Sharing Recommendations", *Communications of the ACM*, 40(3):59–62 (Mar. 1997).

Locke, "Intelligent Agents Create Dumb Users (?)," Online & CDROM Review, Learned Information Europe, UK, v21, n6, pp. 369–372, Dec. 1997.

Dragan et al., "Advice from the Web," PC Magazine, v16, n15, p. 133(7), Sep. 1997.

Tsang et al., "An Object Oriented Intelligent Tourist Advisor System," Intelligent Information Systems, 1996, Australian and New Zealand Conference, pp. 6–9, Nov. 1996.

Montani et al., "A Case–based Reasoning System For Diabetic Patient Therapy," Proceedings on the Third International Conference on Neural Networks and Expert Systems in Medicine Healthcare, pp. 160–168, Sep. 1998.

Langley et al., "Applications of Machine Learning and Rule Induction," Communications of the ACM, v38, n11, pp. 54–64, Nov. 1995.

Cox, "How a Machine Reasons: Part 8. (How rules are stored and executed in rule–based systems)", AI Expert, v8, n3, p. 13(4), Mar. 1993.

\* cited by examiner

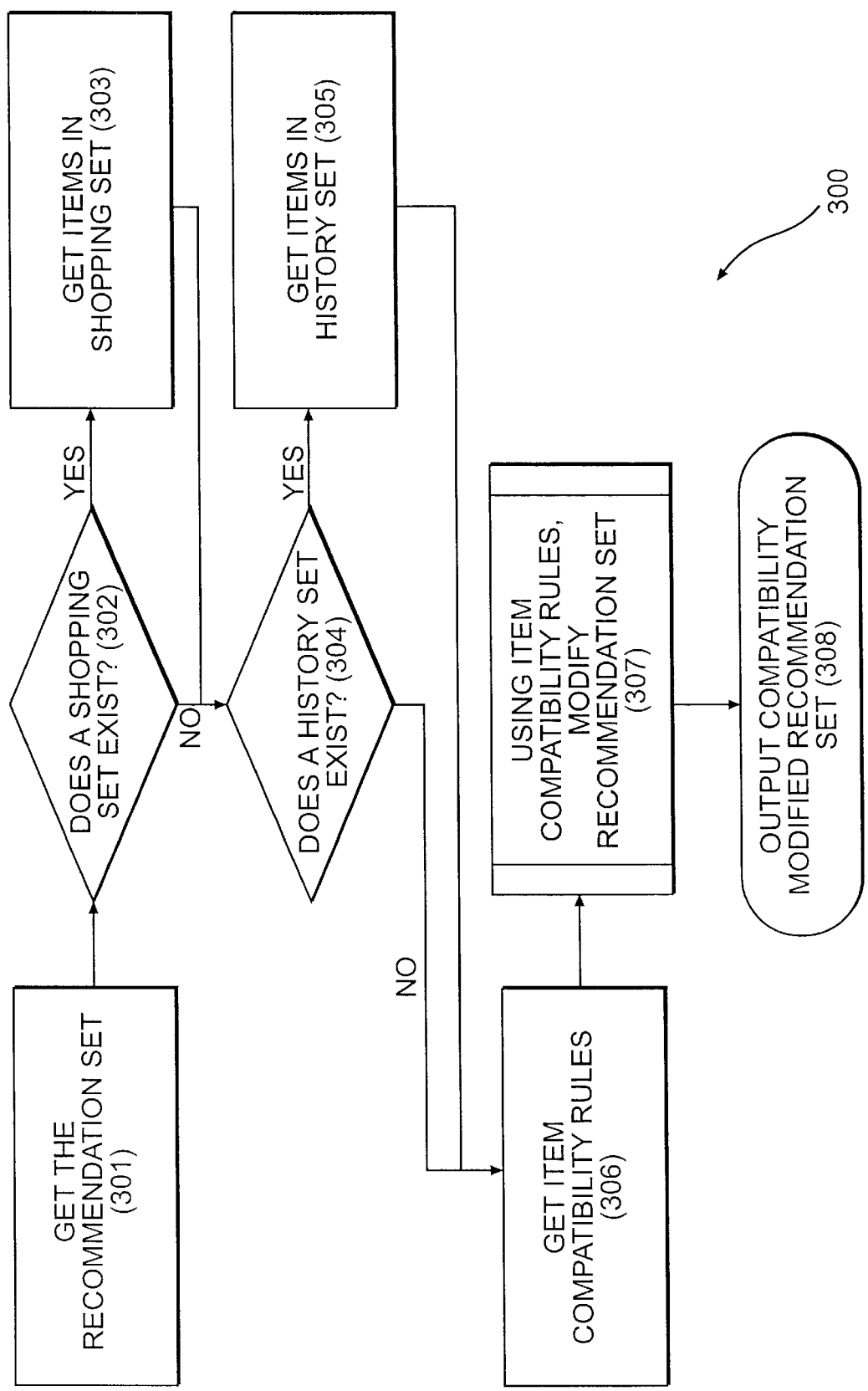

510: Apply_A_Rule

INPUTS: RULE
    USES: NewRecommendationSet

ITEM=RHS(Rule)

IF (LOOKUP(ITEM,NewRecommendationSet)==NOTFOUND)
        Insert(NewRecommendationSet, Item, NEUTRALSCORE)

PTR=LOOKUP(ITEM,RECOMMENDATIONSET)
    IF (Rule.Type==Complement)
        PTR->Score+=Rule->DiffValue
    ELSE
        PTR->Score-=Rule->DiffValue

← 500

520: Method

INPUTS: OriginalRecommendationSet, ShoppingSet, HistorySet, RuleSet
    OUTPUT: NewRecommendationSet
    LOCAL: UsedItems={}, DoneItems={}

NewRecommendationSet=copy(OriginalRecommendationSet)

foreach Item in (ShoppingSet UNION HistorySet)
        if (LOOKUP(Item, UsedItems)==NOTFOUND)
            Insert(UsedItems, Item)
            foreach Rule in RuleSet
                if (Item==LHS(Rule))
                    Apply_A_Rule (Rule)

Sort (NewRecommendationSet) with numerical KEY Score in DESCENDING order foreach Item in NewRecommendationSet
        if ((Item->Score>=RECTHRESHOLD)
          AND (LOOCKUP(Item, UsedItems)==NOTFOUND))
            Insert(UsedItems, Item)
            Insert(DoneItems, Item)
            foreach Rule in RuleSet
                if ((Item==LHS(Rule)) AND (LOOKUP(RHS(RULE),
                    DoneItems)==NOTFOUND))
                    Apply_A_Rule (Rule)

Sort (NewRecommendationSet) with numerical KEY Score in DESCENDING order

*FIG. 5*

810: Apply_A_Rule

INPUTS: RULE
    USES: NewRecommendationSet

ITEM=RHS(Rule)

IF (LOOKUP(ITEM,NewRecommendationSet)==NOTFOUND)
        SCORE=GetRecommendationScore(ITEM, USER)
        Insert(NewRecommendationSet, Item, SCORE)

PTR=LOOKUP(ITEM,RECOMMENDATIONSET)
    IF (Rule.Type==Complement)
        PTR->Score+=Rule->DiffValue
    ELSE
        PTR->Score-=Rule->DiffValue

← 800

820: Method

INPUTS: OriginalRecommendationSet, MatchSet, RuleSet
    OUTPUT: NewRecommendationSet
    LOCAL: UsedItems={}, DoneItems={}

NewRecommendationSet=copy(OriginalRecommendationSet)

foreach Item in MatchSet
        if (LOOKUP(Item, UsedItems)==NOTFOUND)
            Insert(UsedItems, Item)
            foreach Rule In RuleSet
                if (Item==LHS(Rule))
                    Apply_A_Rule (Rule)

Sort (NewRecommendationSet) with numerical KEY Score in DESCENDING order foreach Item in NewRecommendationSet
        if ((Item->Score>=RECTHRESHOLD)
          AND (LOOCKUP(Item, UsedItems)==NOTFOUND))
            Insert(UsedItems, Item)
            Insert(DoneItems, Item)
            foreach Rule In RuleSet
                if ((Item==LHS(Rule)) AND (LOOKUP(RHS(RULE),
                    DoneItems)==NOTFOUND))
                    Apply_A_Rule (Rule)

Sort (NewRecommendationSet) with numerical KEY Score in DESCENDING order

*FIG. 8*

901: METHOD FOR INFERRING SUBSTITUTE RULES

Foreach row from 1 to NUMITEMS
    Foreach column from row+1 to NUMITEMS
        if ((value[row,column]/TotalPurchases(row) < SubThreshold)
          AND
          (TotalPurchases(row) > SubSignifThreshold))
        then
          Add_Rule (row->NOT column);

if ((value[row,column]/TotalPurchases(column) < SubThreshold)
          AND
          (TotalPurchases(column) > SubSignifThreshold))
        then
          Add_Rule (column->NOT row);

---

902: METHOD FOR INFERRING SUBSTITUTE RULES

Foreach row from 1 to NUMITEMS
    Foreach column from row+1 to NUMITEMS
        if ((value[row,column]/TotalPurchases(row) > CompThreshold)
          AND
          (TotalPurchases(row) > CompSignifThreshold))
        then
          Add_Rule (row->column);

if ((value[row,column]/TotalPurchases(column) > CompThreshold)
          AND
          (TotalPurchases(column) > CompSignifThreshold))
        then
          Add_Rule (column->row);

*FIG. 9 CONT.*

SYSTEM, METHOD, AND ARTICLE OF MANUFACTURE FOR MAKING A COMPATIBILITY-AWARE RECOMMENDATIONS TO A USER

RELATED APPLICATIONS

This application is related to the following U.S. patent and patent applications, which are incorporated by reference:
1. SYSTEM, METHOD AND ARTICLE OF MANUFACTURE FOR USING RECEIVER OPERATING CURVES TO EVALUATE PREDICTIVE UTILITY, U.S. Pat. No. 5,842,199.
2. SYSTEM, METHOD, AND ARTICLE OF MANUFACTURE FOR UTILIZING IMPLICIT RATINGS IN COLLABORATIVE FILTERS, filed Oct. 7, 1996, Ser. No. 08/725,580, now U.S. Pat. No. 6,108,493, issued Aug. 22, 2000.
3. SYSTEM, METHOD, AND ARTICLE OF MANUFACTURE FOR GENERATING IMPLICIT RATINGS BASED ON RECEIVER OPERATING CURVES, filed Oct. 8, 1996, Ser. No. 08/729,787, now U.S. Pat. No. 6,016,475, issued Jan. 18, 2000.
4. SYSTEM, METHOD AND ARTICLE OF MANUFACTURE FOR INCREASING THE USER VALUE OF RECOMMENDATIONS MADE BY A RECOMMENDER SYSTEM, filed Jul. 17, 1998, by P. Bieganski, application Ser. No. 09/118,025.
5. SYSTEM, METHOD AND ARTICLE OF MANUFACTURE FOR MAKING HIGH USER VALUE RECOMMENDATIONS, filed Jul. 17, 1998, by P. Bieganski, application Ser. No. 09/118,026.

BACKGROUND

The present invention relates generally to data processing systems, and more particularly, collaborative filtering and recommender systems.

Recommender systems predict the preferences of users based on attributes known about the user or a past history of preferences or consumption by the user. For example, a recommender system may predict that a user will like the movie "Titanic" because he previously indicated a liking for such other epic movies as "Lawrence of Arabia" or "Ben Hur".

Present recommenders focus on making accurate recommendations of user preference. However, the most accurate recommendations, in isolation, may be the wrong items when considered collectively as a set of recommendations and as recommendations designed to accompany products that the user is buying or has bought. For example, a system recommending books may discover that a particular customer would enjoy Tolkien's *The Hobbit,* based on other books that the user did and did not like. *The Hobbit,* however, appears in more than thirty editions, from hardcover to paperback, audiobook to videocassette, editions bundled with other books, and editions illustrated by different illustrators. If the recommender system were to suggest that the customer consider several of these, it would likely annoy the user and waste the opportunity to recommend a more diverse set of books. As important, if we know that the customer already owns one edition of *The Hobbit,* we likely would prefer to avoid recommending another edition, so as to add greater value to the bookstore's recommendations. Similar examples also occur where having an item makes recommending a different item more valuable. For example, a student who has a copy of a particular textbook in her shopping cart would be well-served by a recommendation for the study guide that accompanies that textbook, even if her prior purchases do not independently indicate that the study guide is an item she would otherwise be likely to buy.

A recommender system determines its recommendations by examining previous user preference data. The preference data can be unary or numerically valued. Unary preference data is a set of customer-item pairs: a customer-item pair indicates that an event linking the customer to the item has occurred. No additional preference information is available to the recommender system about the a user-item event except that it happened. The non-existence of a customer-item pair (more generally known as a tuple) for a specific customer-item pair does not indicate a preference: it only indicates a lack of information. An example of unary customer data is purchase record data where a customer-item pair indicates that the customer has purchased the indicated item. Another example of unary data is contained in web page logs, where a customer-item pair indicates that the customer has visited a specific web page.

Binary and numerically valued preference data are generally in the form of a 3-tuples, where the three elements of the tuple are customer identifier, item identifier, and preference value. The preference value indicates, for example, the strength of the user's preference for the item or whether the user's preference is either for or against the item. To illustrate, where the preference is represented in binary form, a "0" may mean a preference against an item while a "1" means a preference for the item. Where the preference is presented as numerically valued data, the data value may represent a one-dimensional axis of preference, with the midpoint indicating an ambivalent preference for the item, a low value indicating a strong dislike for the item, and a high value indicating a strong preference for the item.

Preference data may be presented to the recommender system in explicit or implicit form. Explicit preference data are preference values that a user has supplied directly, for example by filling out a survey. Implicit preference data consist of preference values that have been inferred by observing actions that the user has taken. It can be inferred that the user has some preference for the item that she has just bought, although the act of purchasing the item is not an explicit statement of preference per se. A user's preference for a web page may be inferred, for example, by measuring the amount of time that the user spends reading the web page, or the number of times the user returns to that page.

The inputs to a recommender system are typically preference values as described above. The outputs of the recommender system are predictions of preference values for items, particularly those for which the user has not already indicated a preference. Like the input values, the output preferences may be unary, binary, or numerically valued. A system that outputs unary recommendations predicts items that will be of interest to the user, but does not attempt to predict the strength of a user's preference for each item. Binary predictions indicate items that are likely to be of high preference to the user and items that are likely to be of low preference, but again cannot provide an estimate of preference strength. Numerically valued preferences indicate a preference for or against the item and also indicate the preference strength. Note that the domain of the preference input may be different from the domain of the output preference predictions. For example, the preference input may be unary, while the output preference predictions may be numerically valued.

While unary and binary preference values do not indicate the strength of the preference, some recommender systems may additionally rank the preference predictions being returned such that the highest rank predictions have the largest probability of being correct. Numerically valued items are implicitly ranked.

Existing recommender systems generate recommendations by selecting the highest-ranking positive preference values. However, this technique does not always provide a desirable effect. In some cases, there may be strong correlative effects between a current or past purchase, and a recommendation that otherwise would have a low ranking. For example, the purchase of 35 mm film may rank low on a recommendation list, or may not even be on the recommendation list, given the current contents of a shopping basket. However, if there is knowledge in the recommender system that the user has previously purchased a 35 mm camera, then it becomes more sensible to recommend 35 mm film to the user.

There may also be strong anti-correlative effects that should be taken into account to remove a recommendation from a recommendation list. For example, if a user has purchased a pizza and a bottle of root beer made by one manufacturer, then, there is little value in recommending that the user by root beer made by another manufacturer.

Therefore, there exists a problem with existing recommender systems that, although able to recommend items with high confidence level, the recommender system is unable determine the quality of recommendations in view of other items present in the shopping basket, the recommendation set or in an historical set of past purchases. Consequently, the value of some of the recommendations made to a user may be low. There is a need to reduce the frequency of occurrence of low value recommendations.

SUMMARY OF THE INVENTION

To address the problems listed above, the present invention is directed to generating compatibility-aware recommendations for the user. In particular, the invention is directed to an electronic processing system for generating a compatibility-aware recommendation output set to a user based, at least in part, on a set of item compatibility rules. The system includes a processing system of one or more processors configured to receive applicable data, including i) user preference data, and ii) item compatibility rules, and to produce a compatibility-aware recommendation output set using the user preference data and the item compatibility rules.

In another embodiment, the invention is directed to a method of producing a compatibility filtered and weighted recommendation to a user, the method using a computer having a processing system having one or more sets of processors, and an input/output interface. The method includes receiving applicable data, using the processing system, including i) user preference data, and ii) item compatibility rules, and producing, using the processing system, a compatibility-aware recommendation output set using the user preference data and the item compatibility rules.

In another embodiment, the invention is directed to a computer-readable program storage device, having a set of program instructions physically embodied thereon, executable by a computer, to perform a method of producing a compatibility-aware recommendation. The method includes receiving applicable data, including i) user preference data and ii) item compatibility rules, and producing a compatibility-aware recommendation output set using the user preference data and the item compatibility rules.

The above summary of the present invention is not intended to describe each illustrated embodiment or every implementation of the present invention. Other features of the invention, together with a fuller understanding of the invention will become apparent and appreciated by referring to the following description and claims taken in conjunction with the accompanying drawings.

BRIEF DESCRIPTION OF THE DRAWINGS

The invention may be more completely understood in consideration of the following detailed description of various embodiments of the invention in connection with the accompanying drawings, in which:

FIG. 3 illustrates a method of implementing a compatibility modifier;

FIG. 5 illustrates methods for modifying items in a recommendation set with a recommendation score in a compatibility modifier;

FIG. 8 illustrates methods for modifying items in a recommendation set with a recommendation score in a compatibility aware recommendation engine;

Figure 1:
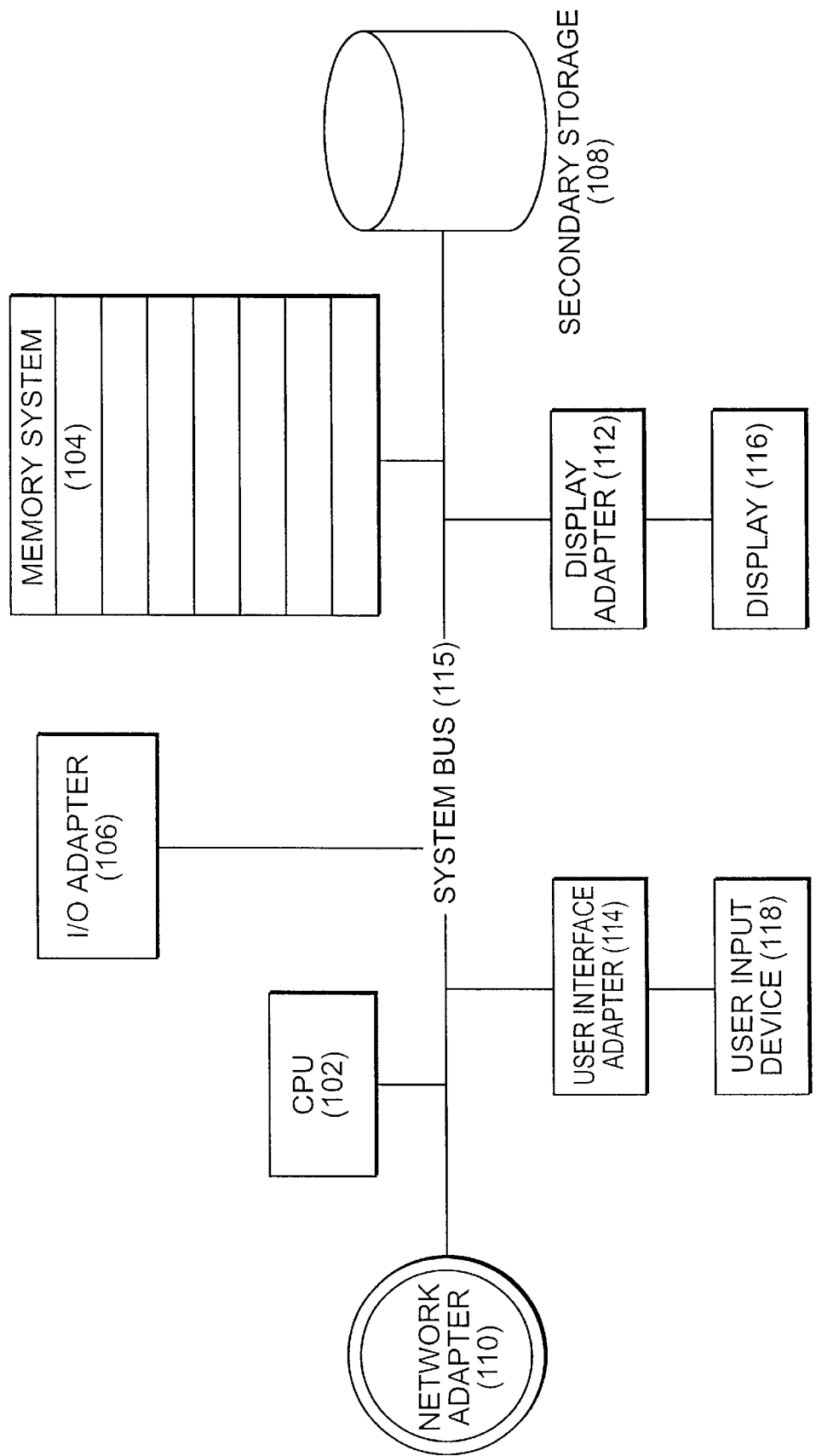
FIG. 1 illustrates a computer system for use with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

This invention is applicable to recommender systems, and is believed to be particularly applicable to increasing the value of recommendations made by recommender systems. In particular, the invention is believed to be applicable to increasing the value of recommendations made by existing recommender systems passing the recommendations through a compatibility modifier to add items to, or subtract items from, the recommendation list.

Recommender systems concentrate on making accurate recommendations, but do not take account of the compatibility of a recommendation with other items that may be in the shopping basket, in historical purchase data or in the present recommendation set. Recommender systems, therefore, would benefit from incorporating item compatibility. We define item compatibility as the relationships among items that make some items substitutes or complements for other items.

A substitute relationship exists when a customer generally consumes one item or the other, but not both. Examples of substitutes include skim milk and whole milk. Most customers do not purchase these items together. We should note that for compatibility purposes, substitutes need not actually replace each other in a precise way. For example, tofu and bacon may be substitutes for each other if the people who consume tofu generally do not consume bacon or vice versa. In the book example, each edition of the Hobbit is a substitute for other editions, though the strength of the relationship may vary. For example, someone who owns a complete set of Tolkien novels is unlikely to buy a separate copy of The Hobbit, but someone who owns only a copy of The Hobbit may be willing to buy the complete set, since it includes many other novels.

A complement relationship exists when the fact that a customer owns or consumes one item generally indicates that the customer will prefer or consume another item or set of items. For example, sugar and cream are both complements for coffee, and hot dog buns and mustard are complements for hot dogs. Complements may be either one-way or two-way. For example, the purchase of eggs may not indicate a likely purchase of cake mix, but the purchase of cake mix may strongly suggest the purchase of eggs, since eggs are used with cake mix to make a cake. Other examples of complements include film for cameras, batteries for battery-operated toys and electronics, and video cassettes for VCRs. Note that some complement relationships persist for a long period after the product is purchased (e.g., owning a camera leads to a long sequence of film purchases), while others are more immediate (e.g., having bought cake mix in the past doesn't generally increase the future likelihood of buying eggs. In the textbook example provided above, a study guide is a likely complement for an associated textbook, and may have a value that persists for a period of time corresponding to the duration of the course of study.

A recommendation set is defined as a set of items recommended to a user. The recommendation set may be unordered, in which case the weight accorded to each recommended item is equal. The recommendation set may be ordered, in which case some items (generally those at the top of the recommendation list) are recommended more strongly than others. The recommendation set may include recommendation values associated with each item, in which case the strength with which each item is recommended is indicated by the associated value.

Recommendation sets may be generated in many ways. Common mechanisms include "word of mouth" wherein a person suggests items to another person, publication of individual opinions such as movie or restaurant reviews written by critics (which often have stars to indicate a recommendation value); publication of collected opinions such as the automobile reliability and movie ratings published by Consumer Reports; evaluation by systematic and possibly objective ratings formulas as is commonly done for comparative product reviews; evaluation by software systems that evaluate the contents of the items being considered as is commonly done for information retrieval searches such as library and world wide web searchers; and collaborative filtering systems that use the opinions of multiple users to create a recommendation for other users. An interesting case is the use of a recommendation engine, which incorporates collaborative filtering, content analysis, or both to automate the process of generating recommendations. The present invention is applicable to recommendation sets generated in all manners, including those recommendation sets generated by recommendation engines.

Compatibility-modified recommendation sets are recommendation sets that incorporate knowledge about item compatibility and knowledge about the items that are already being recommended to, being purchased by, or previously purchased by the user. A compatibility-modified recommendation set may exclude items that would be recommended without compatibility information; it may recommend items that would not have been recommended without compatibility information; and it may reorder or assign new recommendation values to items being recommended.

Compatibility-modified recommendation sets provide greater value to the users of a recommendation system. The customer receiving the recommendations receives a set of recommendations that is less likely to recommend items that conflict with other items and is more likely to contain items compatible with those items being purchased, either presently or previously, or being recommended.

A marketer who uses compatibility-modified recommendations is provided with a set of recommendations that is more likely to anticipate real customer interests, and therefore is more likely to lead to successful suggestive selling.

The present invention is directed to the creation of compatibility-modified recommendation sets. It is useful for improving the quality of a recommendation set by taking advantage of knowledge of item compatibility, in the form of item compatibility rules, and taking advantage of the knowledge of which items a customer has previously purchased, is presently purchasing, or are being presently recommended to a user.

The present invention may be used to modify a recommendation set that is provided from any source, or may be employed in a recommendation engine that uses compatibility rules to generate compatibility-modified recommendations directly.

It is important to note that, although much of the description contained herein refers to implementations that use a particular form of item compatibility rule, namely one-way item-to-item substitution and complement rules, the invention is not limited to this form of rule. The invention described herein can apply item compatibility rules in any form to recommendations. It is also important to note that, although much of the description contained herein refers to unordered recommendation sets, the invention is not limited to unordered recommendation sets and may be used to modify recommendation sets of any type to improve their value by incorporating knowledge about item compatibility.

FIG. 1 shows a diagram of a typical computer system suitable for practicing the present invention. The computer may include a system of one or more central processing units (CPUs) 102, a memory system 104, an input/output (I/O) adapter 106, a secondary storage 108, a network interface 110, a user interface adapter 114, and a display adapter 112. All of the computer components are connected by a system bus 115. The display adapter 112 may be connected to a display 116 for displaying a recommendation to a user. The user interface adapter 114 may be connected to a user input device 118, such as a keyboard, mouse, barcode scanner or the like.

The computer system may include more than one processor, where the processors are in different locations. In such a case, the processors may be linked by input/output interfaces over a network, such as a local area network, wide area network or the Internet.

Figure 2:
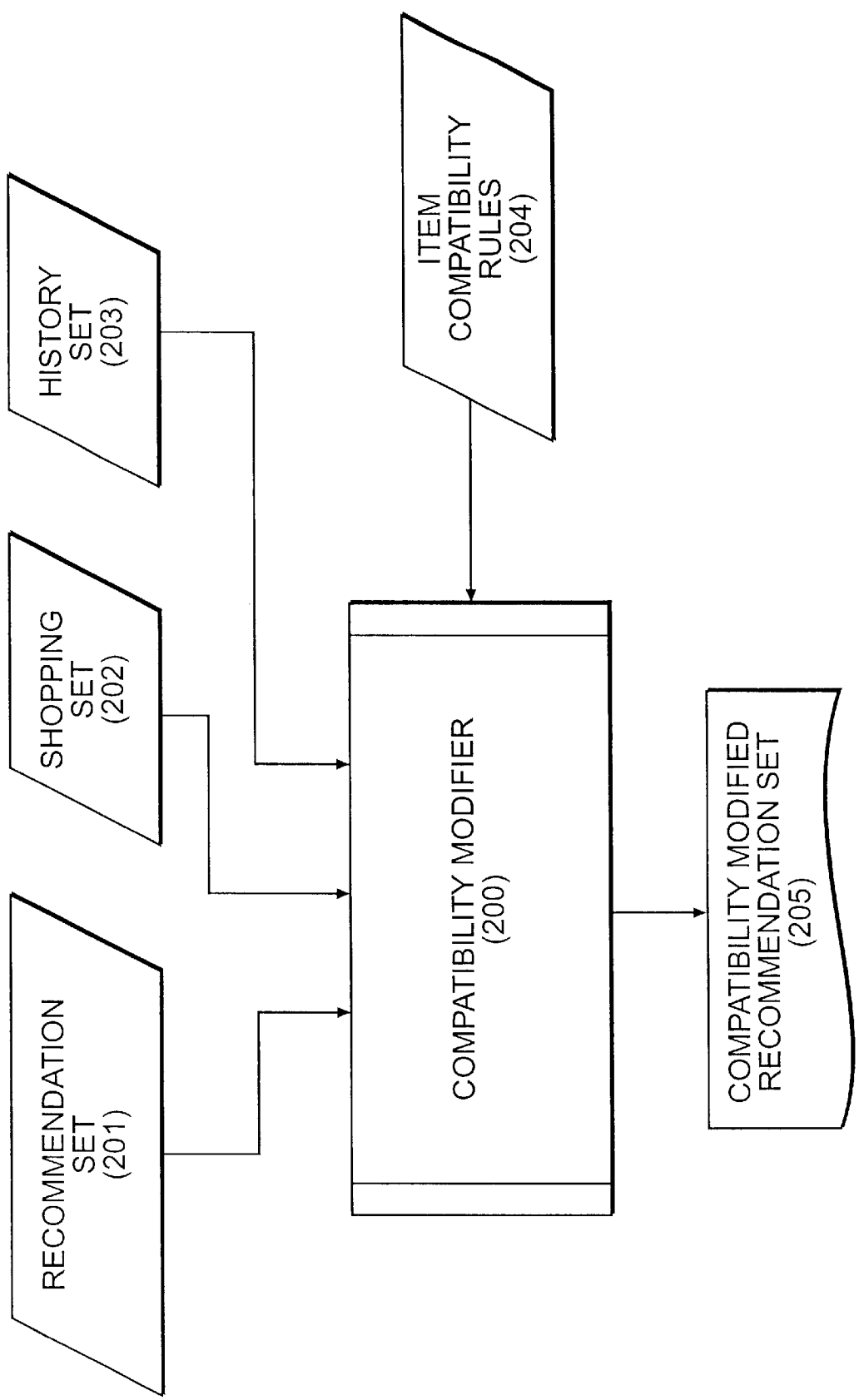
FIG. 2 illustrates a system for generating a compatibility-modified recommendation output set for a user according to one embodiment of the invention.

In one particular embodiment of the invention, illustrated in FIG. 2, a compatibility modified recommendation set 205 is generated by a compatibility modifier 200 that uses a recommendation set 201 and a set of item compatibility rules 204. The compatibility modifier may also use a shopping set 202 and an historical set 203. The generation of the compatibility modified recommendation set 205 in this embodiment requires the use of the recommendation set 201 and the item compatibility rules 204. The shopping set 202 and the history set 205 are optional and may be used in any combination with the recommendation set 201 and the item compatibility rules 204. The item compatibility rules 204 are used to determine which items should be added to, removed from, and changed in the recommendation set 201 to yield the compatibility modified recommendation set 205.

There are many different ways to determine recommendation sets 201, shopping sets 202, history sets 203, and item compatibility rules 204. Each of the sets and rules is based on a universal set of items that defines the products, services, or other goods that customers may buy or own. The universal set of items is extremely flexible, and is generally customized for each application. For some retail applications, the universal item set exactly matches the products for sale by a particular retailer. In other retail applications, the universal item set is augmented to include products that a user may have purchased elsewhere that are not sold by the retailer, combinations of products that form common sets, or product aggregates and category items such as "Tolkien" for a bookstore or "produce" for a grocery store. Other applications include items that correspond to demographic or psychographic properties that a customer may possess. The present invention works with all such item sets. For purposes of clarity, we refer here to the subset of items that may be recommended (usually the same as or a subset of those for sale) as the recommendable items.

A recommendation set 201 is a set of recommendations on the recommendable items. These recommendations may be provided by an outside source or generated automatically using, for example, genetic algorithms, collaborative filtering, neural networks, or other statistical models. The recommendations may also be pre-determined based on vendor specifications, or derived from human or computer-based experts. For example, the recommendation set in a book store may be a list of recommended books that employees and book reviewers found interesting. In a travel agency, the recommendation set may consist of hotels and restaurants contained in the travel agency's travel guide. For specific applications where shopping sets and/or historical sets are used, and for specific users at specific times, the recommendation set may be empty; an empty recommendation set simply indicates that the system has no recommendable items to suggest at that time. An empty set can still be compatibility-modified, since the modification may add new items to the set.

A shopping set 202 includes items for which the user has indicated a current intent to purchase or consume. The user's indication may be explicitly declared or inferred from user actions. Examples of ways that a shopping set can be generated include, but are not limited to: using the contents of a "market basket" from an Internet-based shopping service; using an active shopping cart that scans the bar codes of products being placed in the basket; using the set of items entered into a cash register at check-out time; and using a shopping list provided by the customer. A shopping set may also be generated by observing the customer's behavior. It is advantageous to use a shopping set when the value of recommendations provided to the user can be increased based on their compatibility with products currently being purchased. Hence, a cooking store might use the shopping set at check-out to identify items for suggestive selling, such as a Chinese cookbook for customers purchasing a Wok.

An historical set 203 consists of explicit or implicit information about the user's possession of and preference for items. The historical set may include a list of items selected or purchased by the user in past interactions with the system, or just purchased recently; a list of items that the user owns, whether purchased through the system or elsewhere; a list of user ratings of items, based upon expressed user preferences, inferred preferences, or other data. The historical set may also include any other set of data that represents information about the user's possession of and preference for items before the present interaction with the system. Historical data may, for example, include data gathered from credit card records, marketing surveys, and other commercially available sources of individualized preference data. For example, a store that sells film and batteries may use the historical set to store the types of cameras owned by the user, since they help predict which film and batteries to recommend. A grocery store may record the type of milk purchases, since a customer who regularly purchases whole milk may not value a recommendation for skim milk. A bookstore may record a list of the books purchased by the customer to allow it to recommend sequels to books already purchased and to avoid recommending books that are incompatible with the ones already owned.

The terms "elements", "sets" and "collections" are used in the description below. An element is typically a specific product that can be selected by the customer, whereas a set is generally a less specific grouping of elements. For example, a 32 oz. jar of "Hellman's™ mayonnaise" and a 32 oz. jar of "Kraft™ mayonnaise" are examples of elements, while "mayonnaise" describes a set of different elements that includes "Hellman's™ mayonnaise" and "Kraft™ mayonnaise". A collection is a grouping of elements or sets of elements that may be associated with each other. For example, mayonnaise and dijon mustard may be placed in a collection because the marketer wishes to express the knowledge that a customer buying both mayonnaise and dijon mustard would be likely or unlikely to purchase "Dijonaise"™, which is a mixture of both mayonnaise and dijon mustard. The term "item" is used as a generic term to describe elements, sets and collections.

Item compatibility rules 204 express compatibility relationships among items. There are many ways of representing item compatibility: unidirectional implication rules, bidirectional implication rules, and generalized rules of various types, including multi-way rules. The rules themselves may relate individual items, sets of items, or specific collections, and they may include weight factors or priorities to indicate the relative importance of or accuracy of the rule. The rules may also be unweighted an unprioritized. Generally, the easiest rules to use are unweighted unidirectional rules that relate one item to another. Such rules are expressed in the following manner:

Complement rule: A→B A implies B Substitute rule: C→~D C implies not D

The basic complement rule means: when item A is recommended to, purchased by, or owned by a user, then item B is likely to be a good companion item. For example, if A is "Diet Cereal" and B is "Skim Milk" then the relationship A→B indicates that people who buy "Diet Cereal" are also likely to be interested in "Skim Milk."

The basic substitute rule means: when item C is recommended to, purchased by, or owned by a user, then item D is unlikely to be a good companion item. For example, if C is "Manufacturer A's mayonnaise" and D is "Manufacturer B's mayonnaise" then the relationship C→~D indicates that people are unlikely to buy mayonnaise from both Manufacturer A and Manufacturer B.

Bidirectional implication rules specify two-way relationships. For example, the bidirectional complement rule A<->B indicates that A is a complement of B and B is a complement of A. This is a more general, and less powerful mechanism than unidirectional rules, since every rule X<->Y can be transformed into two rules: X→Y and Y→X. However, there is no bidirectional way to represent that most "Diet Cereal" customers buy skim milk, but relatively few skim milk customers buy "Diet Cereal". Similarly, bidirectional substitute rules may be transformed into a pair of unidirectional rules with no loss of information.

More generalized forms of expressing rules exist, including rules that have multiple implications. These rules may be used in the present invention, either directly by the compatibility modifier 200 or by transforming the rules into a form directly usable by the compatibility modifier 200.

In addition to relating individual items, rules may also relate sets or collections of items. A rule relates a set of items when the left-hand-side (input), the right-hand-side (output), or both sides (input and output) contain an explicit or implied list of items, any one of which can be substituted into the rule. For example, in the rule:

hot-dog-buns→hot-dogs hot-dog-buns and hot-dogs are both sets that represent all of the different individual products in the category. The meaning of the rule is that the purchase (recommendation) of any item in the hot-dog-buns set would be complemented by a recommendation of any product from the hot-dogs set. This type of rule can be transformed into a set of unidirectional rules among individual items by creating a rule for each pairing of an item from the left-hand-side (input) set with an item from the right-hand-side (output) set. The resulting number of rules is equal to the product of the number of items in each set.

Similarly, substitute rules may be defined among sets of items. The rule:

hot-dogs→~hot-dogs is a typical rule. It should be interpreted to read that the purchase of any item in the hot-dogs set substitutes for (i.e., is incompatible with) recommending any other item in the set. In other words, don't recommend hot dogs to someone who already is buying or receiving a recommendation for other hot dogs.

Item set substitute rules, as well as bi-directional item set compatibility rules can be transformed into item-to-item rules by pairing each item from the left-hand-side set with every item in the right-hand-side set, as suggested above.

Item compatibility rules may include associated weights or values to guide the compatibility modifier 200. The specific weights and values used depend on the particular application. One example involves assigning a rating-scale difference value to each rule. This value corresponds to the amount by which a recommendation should be changed when a rule applies. For example, if hot-dog-buns→hot-dogs with a weight of +2.0, then items in the set hot-dogs gain 2 points on the recommendation scale when hot-dog-buns items are recommended or purchased.

In a second example, a priority level is assigned to each rule, to allow rules of higher precedence to take priority over ones of lower precedence. For example, a "default" rule of lower priority might indicate that different types of film are substitutes for one another (film→~film). Higher priority rules may indicate certain types of film as complementary with certain cameras (e.g., 35 mm-camera→35 mm-film and 110-camera→110 film). The differences in priority may help the compatibility modifier recognize that a customer who owns two different types of camera may want to buy two different types of film, even though most customers buy only one type.

Item compatibility rules may be created in many different ways. These include, but are not limited to, the following. An individual, such as a marketer, may create the rules and enter them into the system using an input device 118: this may be termed a marketer specification. The rules may be generated automatically by a process external to the present invention, including but not limited, to machine learning and statistical analysis processes such as genetic algorithms, neural networks, and rule inference systems, data mining processes, and other statistical analyses of historical product preference and purchase data. The rules may be stored in computer memory 104 or on a secondary storage device 108 and introduced into the system. Rules may also be created by customers themselves, again entered through an input device 118: this may be termed a customer specification. In an embodiment described below, rules may be inferred within a recommendation engine itself. The rules used by the compatibility modifier 200 may be generated by more than one of these processes.

The compatibility modifier 200 accepts as inputs the recommendation set 201, the compatibility rules 204, and, optionally, the shopping set 202 and/or the history set 203. The compatibility modifier 200 applies the compatibility rules 204 to the recommendation set 201, optionally using the shopping and historical sets 202 and 203, to produce a modified recommendation set. In this embodiment of the invention, the compatibility modifier 200 executes as a process on the computer system, for example computer system as shown in FIG. 1, on one or more processors. The compatibility modifier 200 implements a modification algorithm, which is an algorithmic process that applies the rules and generates the modified recommendation set.

An example of a general flow chart to implement a compatibility modifier 200 is illustrated in FIG. 3. The recommendation set 201 is received at step 301. Next, it is determined whether a shopping set 202 exists or not, at step 302. If the shopping set 202 does exist, then it is received, at step 303. Next, it is determined whether a history set 203 exists or not, at step 304. If the history set 203 exists, then it is received by the compatibility modifier 200, at step 305. After all the input data sets 201, 202 and 203 are received, the compatibility modifier 200 receives the item compatibility rules 204, at step 306. The compatibility modifier 200 uses the rules 204 and the input data sets 202 and 203 to modify the recommendation set 201, at step 307, and outputs compatibility-modified recommendations 205, at step 308.

Several different modification algorithms may be used in the compatibility modifier 200, each of which accomplishes the goal of modifying a recommendation set by applying the compatibility rules to improve the value of the set of recommendations collectively. Some of these algorithms also use information about items currently being considered by the user (i.e., the selection set) and items that have historically been preferred or purchased by the user (i.e., the historical set).

Figure 4A:
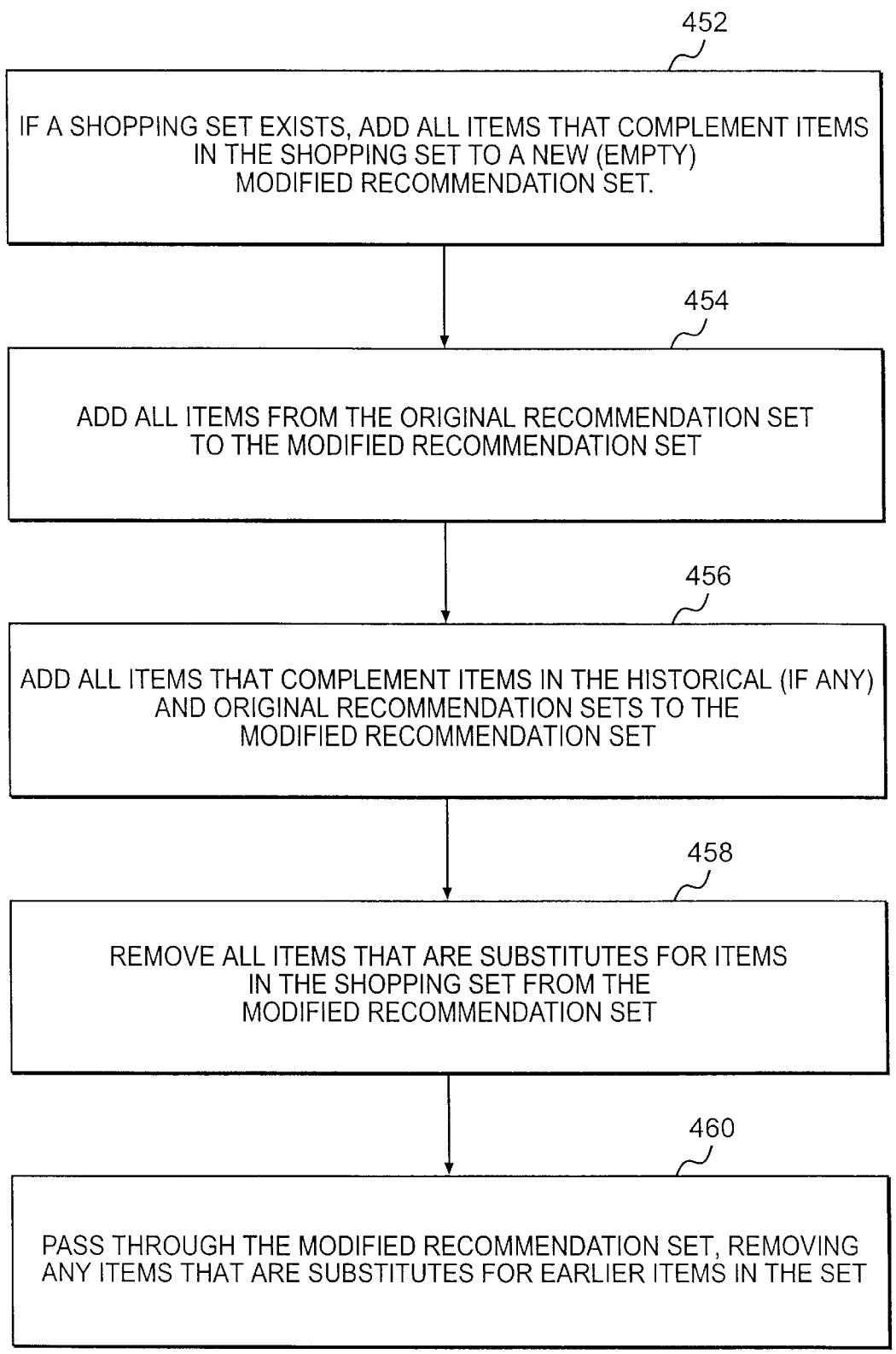
FIGS. 4A and 4B illustrate a method of modifying a set of recommendations to produce a compatibility-modified recommendation output set.
Figure 4B:
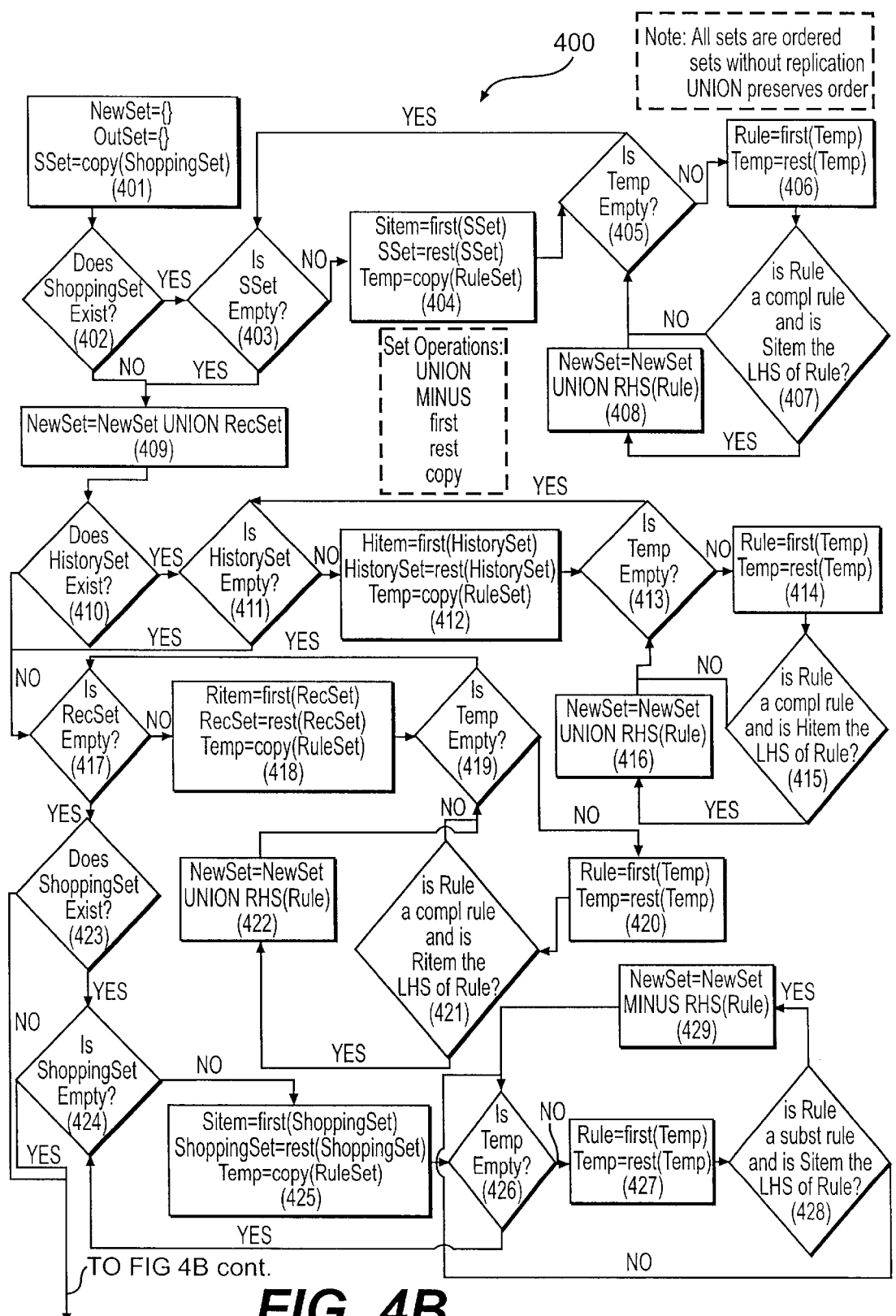
Figure 4B:
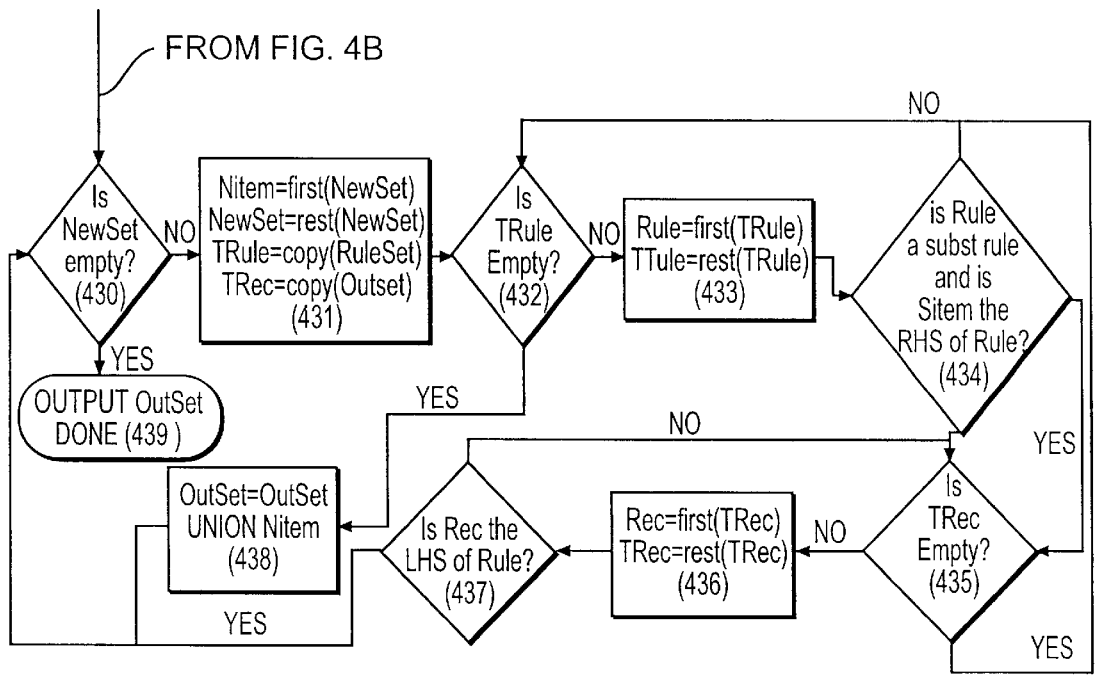

One method for applying unweighted unidirectional rules to an ordered recommendation set is shown in FIGS. 4A and 4B. A generalized form of the method 400 is illustrated in FIG. 4A, while a more specific form is illustrated in FIG. 4B. The following description relates the specific steps shown in FIG. 4B to the general steps of FIG. 4A. In this method 400, a modified recommendation set 208 is produced using the following steps:

1. If a shopping set 202 exists, as determined at step 452, all items that complement items in the shopping set 202 are added to a new, or empty, modified recommendation set. This is a general description of steps 403–408.
2. All items in the original recommendation set 201 are added, at step 454, to the modified recommendation set. This is a generalization of step 409.
3. All items that complement items in the historical set 203 (if any) and the original recommendation set 201 are added, at step 456, to the modified recommendation set. This step is a generalized description of steps 410–416 and steps 417–422.
4. All items that are substitutes for items in the shopping set 202 are removed, at step 458, from the modified recommendation set. This is a generalized description of steps 423–429.
5. Any items that are substitutes for earlier items in the modified recommendation set are removed at step 460. This is a generalized description of steps 430–438.

In following the above steps, the recommendations presented to the user do not include a recommendation not to buy an item present on the shopping list.

Turning now to the specific embodiment illustrated in FIG. 4B, it is important to note that all sets are assumed to be ordered sets without replication. The UNION operator is assumed to preserve order. Various working sets, NewSet, OutSet, and SSet are initialized at step 401, and a determination is made, at step 402, whether a shopping set 202 exists. If there is no shopping set 202, then the method passes directly to step 409. If there is a shopping set, then the set SSet is tested to determine whether it is empty. If it is empty, then the method passes to step 409. If SSet is not empty, then the first item in SSet is selected out as Sitem and a temporary copy of rules Temp is initialized, in step 404. After Temp is tested for being empty, at step 405, the first rule in Temp is extracted as Rule, at step 406. If Rule is a complement rule and Sitem is an input to, in other words on the left hand side of, the Rule, as determined at step 407, then the item on the output of, i.e. on the right hand side of, the Rule is added to NewSet, at step 408. Once all the rules have been tested, as determined at step 405, the method returns to step 403 for the next item in SSet.

Once all the complements for the items in the shopping set have been identified and added to NewSet, NewSet is updated by the addition of the items in the recommendation set RecSet using the UNION operator, at step 409.

A determination is made, at step 410, whether the history set HistorySet exists. If HistorySet does not exist, then the method proceeds to step 417. Where HistorySet is determined to exist, then a determination is made whether HistorySet is empty, at step 411. If HistorySet is empty, then the method proceeds to step 417. Where HistorySet is not empty, the first item in HistorySet is extracted as Hitem, and a temporary copy of rules Temp is initialized, in step 412. After Temp is tested for being empty, at step 413, the first rule in Temp is extracted as Rule, at step 414. If Rule is a complement rule and Hitem is on the left hand side of the Rule, as determined at step 415, then the item on the right hand side of Rule is added to NewSet, at step 416. Once all the rules have been tested, as determined at step 413, the method returns to step 411 for the next item in HistorySet.

Once all the complements for the items in the history set have been identified and added to NewSet, the complements to the items in the recommendation set are added. This starts first by a determination of whether the recommendation set RecSet is empty, at step 417. If RecSet is empty, then the method proceeds to step 423. Where RecSet is not empty, the first item in RecSet is extracted as Ritem, and a temporary copy of rules Temp is initialized, in step 418. After Temp is tested for being empty, at step 419, the first rule in Temp is extracted as Rule, at step 420. If Rule is a complement rule and Ritem is on the left hand side of the Rule, as determined at step 421, then the item on the right hand side of Rule is added to NewSet, at step 422. Once all the rules have been tested, as determined at step 419, the method returns to step 417 for the next item in RSet.

Once no more items exist in RSet, as determined at step 417, NewSet is tested to remove items that are substitutes for items in the shopping set. This commences by determining, at step 424, whether the shopping set ShoppingSet is empty. If it is empty, them the method proceeds to step 430. If it is not empty, then the first item in ShoppingSet is extracted as Sitem, and a temporary copy of rules Temp is initialized, in step 425. After Temp is tested for being empty, at step 426, the first rule in Temp is extracted as Rule, at step 427. If Rule is a substitute rule and Sitem is on the left hand side of the Rule, as determined at step 428, then the item on the right hand side of Rule is subtracted from NewSet, at step 429. Once all the rules have been tested, as determined at step 426, the method returns to step 424 for the next item in ShoppingSet.

Once substitutes for all items in ShoppingSet have been removed from NewSet, the method proceeds to step 430, where a determination is made of whether NewSet is empty. If NewSet is empty, then the method ends at step 439 by outputting OutSet. If NewSet is not empty, then Nitem is extracted from NewSet, TRule is initialized as a temporary copy of RuleSet, and TRec is initialized as a temporary copy of OutSet, at step 431. If TRule is empty, as determined at step 432, the method proceeds to step 438. If TRule is not empty, then the first rule in TRule is extracted as Rule, at step 433. A determination is made, at step 434, whether Rule is a substitute rule and Nitem is on the right hand side of Rule. If not, then the method returns to step 432. If so, then a determination is made whether TRec is empty, at step 435. If TRec is empty, then the method returns to step 432. If TRec is not empty, then the first item in TRee is extracted as Rec, at step 436 and a determination made, at step 437, whether Rec is on the left hand side of Rule. If so, then the method returns to step 430. If not, then the method returns to step 435.

Once TRule is determined to be empty, at step 432, OutSet is updated by adding Nitem, at step 438, after which the method returns to step 430.

This method 400 is useful for applications such as grocery shopping, where it is important to recommend item sets that are compatible with the items currently being purchased by the customer. This is ensured by making it a top priority to place complements to shopping set items at the top of the recommendation set and by removing any items that substitute for items in the shopping set. The second priority is to leverage the recommendations to create a better shopping set. The third priority is to take advantage of historical data. For a shopping application, historical data might include information learned about the customer's pantry behaviors. For example, we may know that a particular customer tends to buy large quantities of pancake mix and therefore trigger a rule that may recommend pancake syrup. An interesting property of this algorithm is that it can function properly even when the recommendation set for a particular user is empty, if that user has a shopping or historical set. In other words, if nothing is known about the customer, no recommendations can be made based on the customer's tastes and historical purchases. However, items can still be suggested that that complement the customer's current selections without substituting for any of those selections.

Another method may be used that operates on a recommendation set in which numerical recommendation scores are associated with the recommendations by applying a rule set that includes numerical difference values with the rules. This second method 500, shown in FIG. 5, constructs a modified recommendation set by applying the rules so as to modify the numerical scores for the recommended items and so as to add items when appropriate. The method 500 does not remove items from the recommendation set; instead it reduces the numerical recommendation score of less favored items. In actual use, the application may filter out recommendations with recommendation scores lower than a certain threshold, or may use low-scoring recommendations to create a "dis-recommended" list, that is a list of items to be avoided after item compatibility has been factored in. This method 500 uses an operation labeled "Apply a Rule" 510 which does the following:

1. If the item on the right-hand-side of the rule is not in the modified recommendation set, that item is added to the modified recommendation set with a recommendation score that represents neutral preference (e.g., 3 on a scale of 1 through 5).
2. For all items on the right-hand-side of a rule, either originally present in the modified recommendation or added in step 1, the rule's difference value is added to (complement rules), or subtracted from (substitute rules) the recommendation score for that item on the right-hand-side.

Another way of performing step 2 is to add a modifier to the recommendation score, where the modifier is positive for a complement rule and negative for a substitute rule.

The remainder 520 of the method is used to create a modified recommendation set as follows:

1. Copy the original recommendation set to initialize the modified recommendation set.
2. Step through each item in the shopping set and historical set, if any. If the item has not already been considered, then apply each rule that has that item on the left-hand-side.
3. Sort the modified recommendation set by numerical recommendation score, such that the first item has the highest score and the last item has the lowest score.
4. Step through each item in the modified recommendation set. If the selected item has a recommendation score below the recommendation threshold, skip it. For each item not skipped, select the set of rules that have the selected item on the left-hand-side. For each rule where the item on the right-hand-side has not already appeared earlier in the modified recommendation set, apply the rule. After applying the rules that apply to the selected item, re-sort the remaining items in the modified recommendation set.
5. Sort the entire modified recommendation set to produce a sorted output set.

This method 500 is advantageous in applications where every item has a recommendation score or where items may intentionally have both high and low recommendation scores. By limiting the application of rules to items being recommended favorably, or to items selected by the user, the method 500 algorithm avoids false recommendations based on compatibility with undesired items. The method 500 may be efficiently implemented using a known set representation, for example one that includes a hash table for rapid lookup and a heap for incremental sorting.

Figure 6:
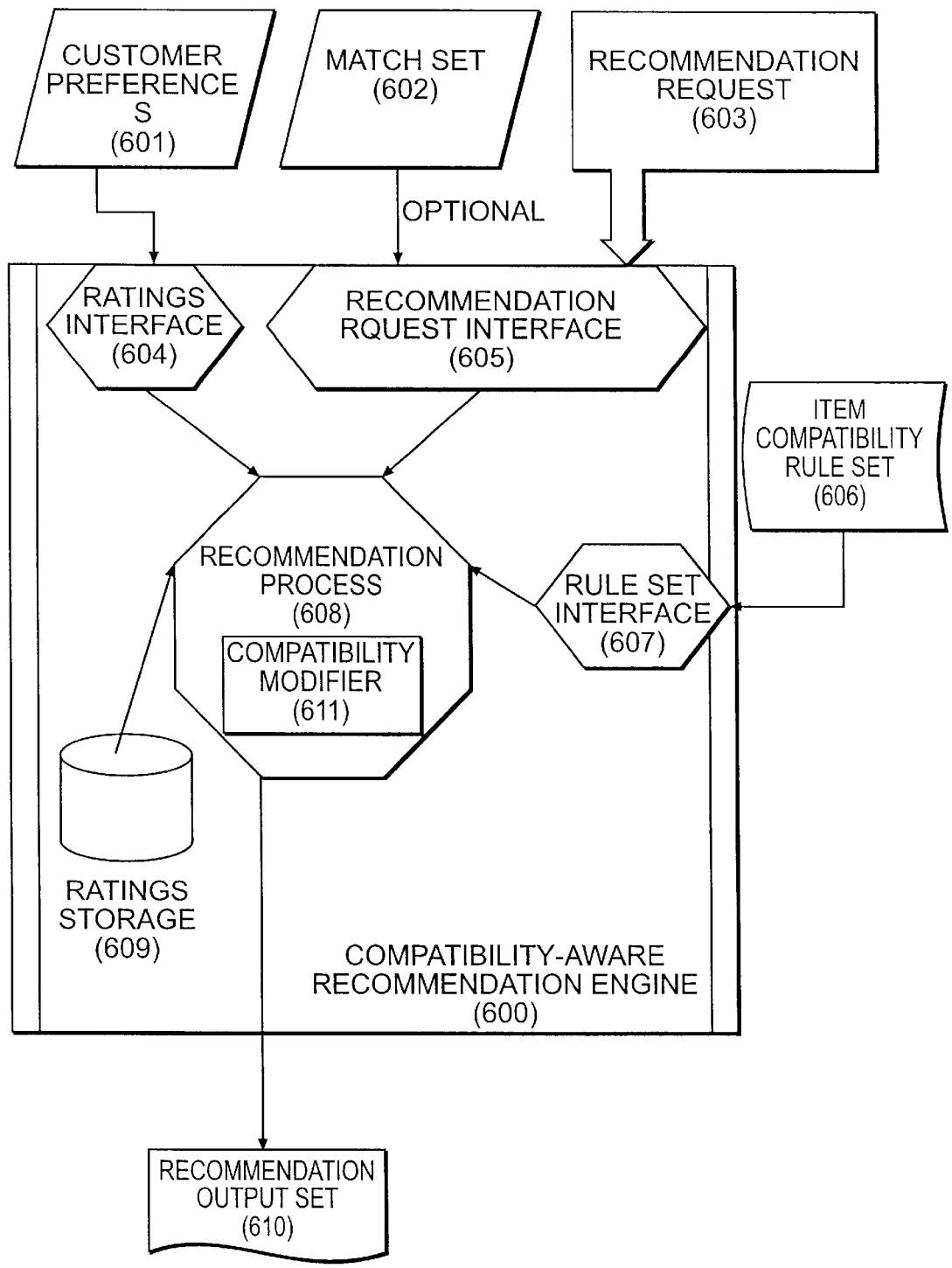
FIG. 6 illustrates a compatibility-aware recommendation system according to another embodiment of the invention.

A second embodiment of the invention is shown in FIG. 6. In this embodiment, the compatibility modifier 611 is integrated into a recommendation engine 600. The recommendation engine may be constructed using one of a number of different methods, for example as is disclosed in Communications of the ACM (Association for Computing Machinery), vol. 40(3), March 1997, in articles by Balabonovic et al., "Content-Based Collaborative Recommendation", pp. 66–72; Kautz et al., "Referral web: Combining social networks and collaborative filtering", pp. 63–65; Konstan et al., "Grouplens: Applying collaborative filtering to Usenet News", pp. 77–87; Resnick et al., "Recommender systems", pp. 56–58; Rucker et al., "Siteseer: Personalized navigation for the web", pp. 73–76; and Terveen et al., "Phoaks: A system for sharing recommendations", pp. 59–62, incorporated herein by reference.

A recommendation engine 600 has two roles and two interfaces that match these roles: recording customer preferences 601 and making recommendations 610. This invention does not change the preference recording role, which is accomplished through the recommendation engine's rating interface 604. The recommendation process includes compatibility as part of the recommendation criteria.

A system using the modified recommendation engine has the following components: a ratings input interface 604; a recommendation request interface 605, which supports requests for recommendations for specific items or requests for a set of recommended items; an optional item match set input 602, which is used with a request for recommendations to specify a set of items with which the recommendation set should be compatible; an item compatibility rule set input 606; a recommendation process 608, storage 609 for customer ratings of items; and a recommendation output set 610, which is the output resulting from a recommendation request 603.

The match set input 602 plays a role similar to that of the shopping set 202 and historical set 203 described in the first embodiment. The system 600 is referred to as a compatibility-aware recommendation engine.

Implementations of a compatibility-aware recommendation engine 600 may include any of the methods described above with regard to the first embodiment of FIGS. 2–5, with the shopping set 202 replaced by the match set 602 and the historical set not provided. An advantage of the present embodiment is that closer connections may be made between the recommendation process and the compatibility information.

The compatibility process may be integrated into the recommendation in one of at least three ways:

1. Use of a match set and item compatibility rules to drive the recommendation process.
2. Use of the recommendation engine to enhance item compatibility algorithms.

3. Integration of item compatibility and recommendation processes in the recommendation engine.

Figure 7A:
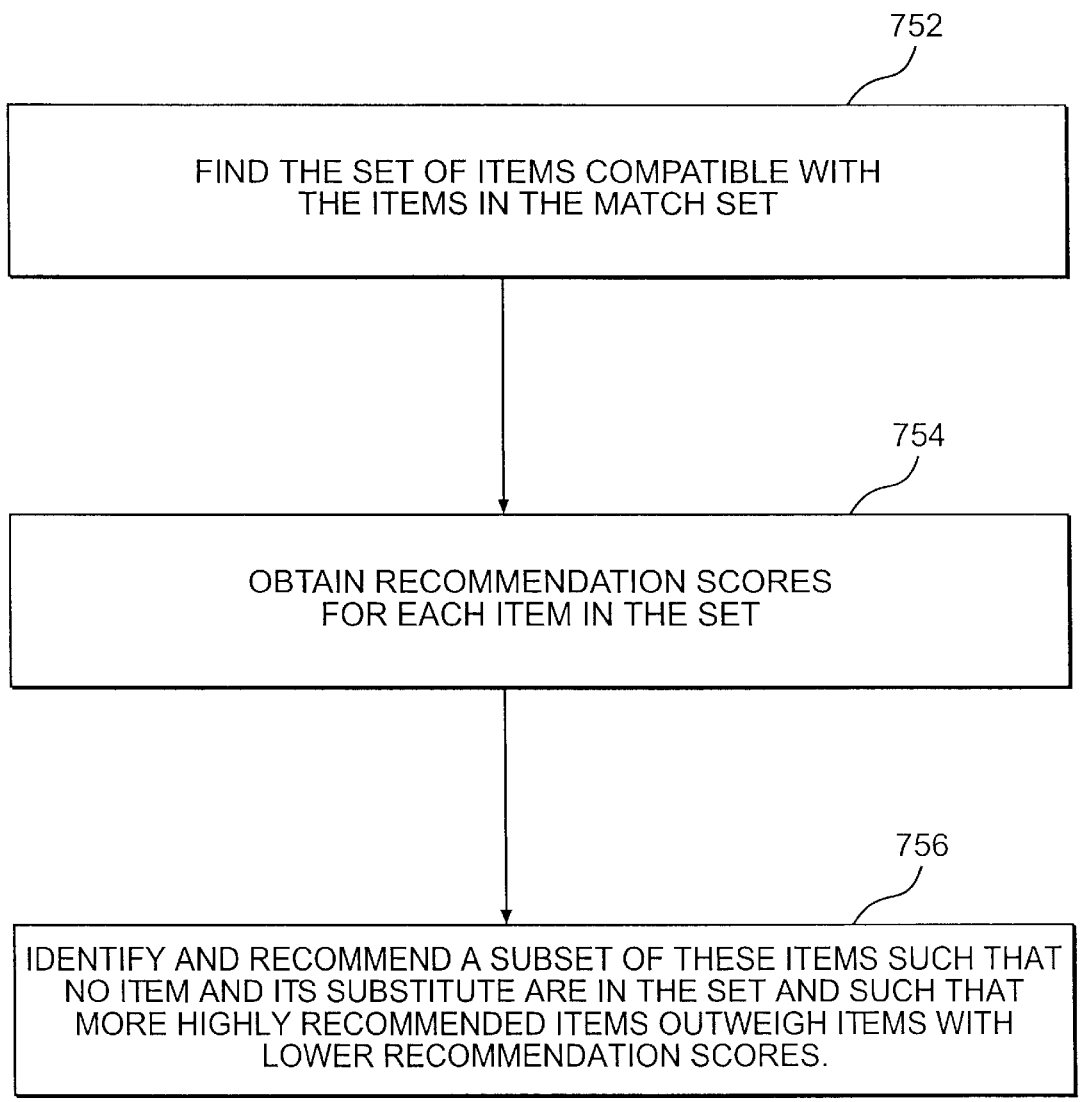
FIGS. 7A and 7B illustrate a method of implementing compatibility awareness within a recommendation engine.
Figure 7B:
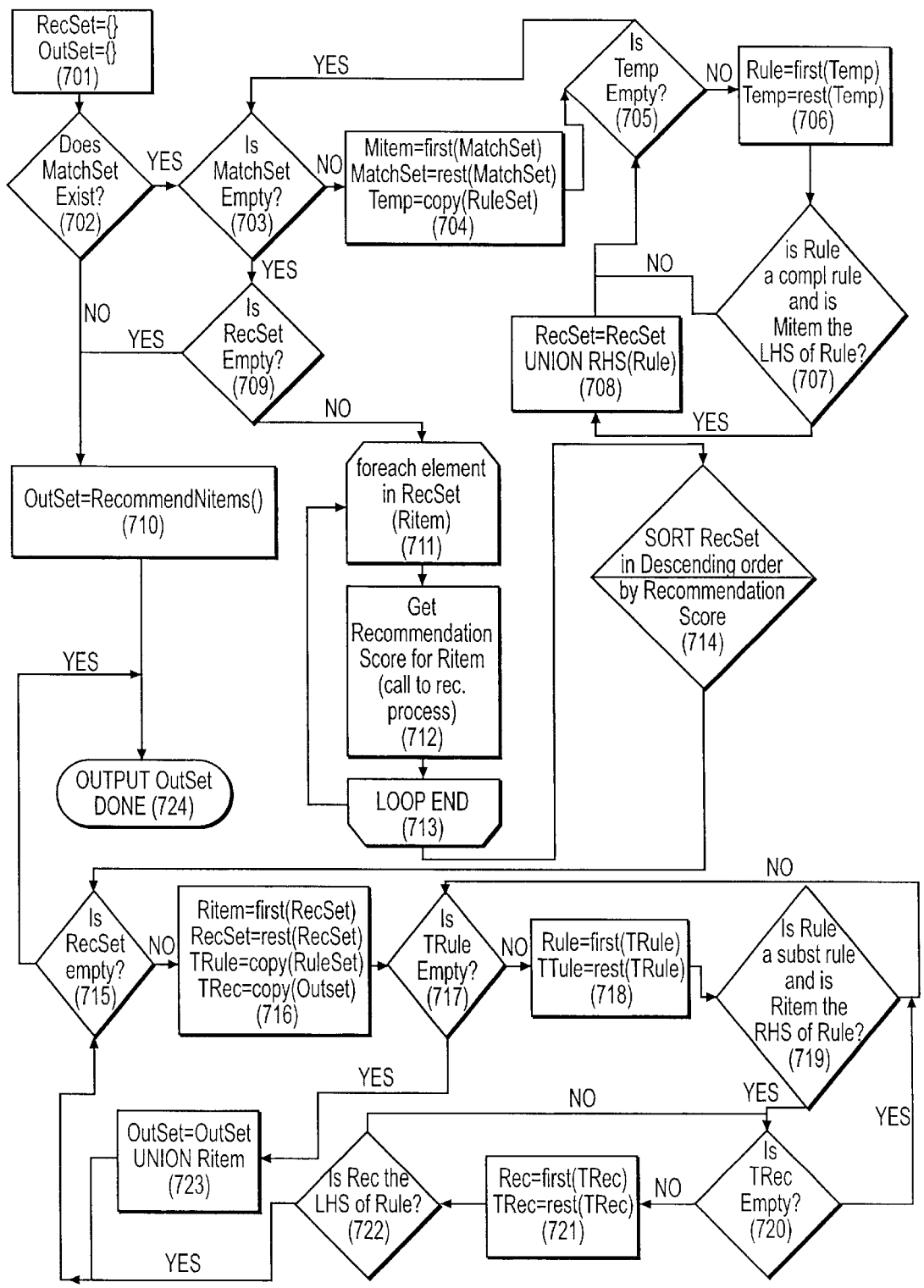

One particular method that uses the match set and item compatibility rules to drive the recommendation process is shown in FIGS. 7A and 7B. The method 750 illustrated in FIG. 7A is a generalized method, whereas the method 700 in FIG. 7B is one particular implementation of the generalized method 750. The following description relates the specific steps shown in FIG. 7B to the general steps of FIG. 7A. In this method 750, a compatibility-aware recommendation set 610 is produced using the following steps:

1. A set of items compatible with those in the match set is generated, at step 752. The set of compatible items includes those that complement items in the match set but do not substitute for items in the match set. This is a generalized description of steps 703–709.
2. Recommendation scores are obtained for each item in the set, step 754. This is a generalized description of steps 711–713.
3. A subset of those items is selected such that no item and its substitute are in the set and such that more highly recommended items outweigh items with lower recommended scores, at step 756. This is a generalized description of steps 714–723.

Turning now to the specific embodiment illustrated in FIG. 7B, it is important to note that all sets are assumed to be ordered sets without replication. The UNION operator is assumed to preserve order. Various working sets, RecSet, and OutSet are initialized at step 701, and a determination is made, at step 702, whether the match set 602, MatchSet, exists. If there is no match set 602, then the method passes directly to step 710. If there is a match set 602, then the set MatchSet is tested to determine whether it is empty, at step 703. If it is empty, then the method passes to step 709. If MatchSet is not empty, then the first item in MatchSet is selected out as Mitem and a temporary copy of rules Temp is initialized, in step 704. After Temp is tested for being empty, at step 705, the first rule in Temp is extracted as Rule, at step 706. If Rule is a complement rule and Mitem is on the left hand side of the Rule, as determined at step 707, then the item on the right hand side of Rule is added to RecSet, at step 708. Once all the rules have been tested, as determined at step 705, the method returns to step 703 for the next item in MatchSet.

Once it has been determined, at step 703, that no items remain in MatchSet, a determination is made whether RecSet is empty. If it is empty, then the method proceeds to step 710, where OutSet is set equal to RecommendedNItems, at step 710 and output at step 724.

If RecSet is not empty, then a loop, steps 711–713, is set up to produce a recommendation score for each item in RecSet. Once all items have recommendation scores, the items in RecSet are sorted in descending order according to recommendation score, at step 714.

The first item in RecSet is extracted as Ritem, a temporary copy of the rules is initialized as TRule, and a temporary copy of OutSet is set up as TRec, at step 716. A determination is made, at step 717, as to whether TRule is empty. If so, then Ritem is added to OutSet via the UNION operator, at step 723. If not, then the first rule in TRule is extracted as Rule, at step 718. A determination is made, at step 719, whether Rule is a substitute rule and Ritem is on the right hand side. If not, then the method returns to step 717. If so, then a determination is made whether TRec is empty, at step 720. If so, then the method returns to step 717. If not, the first item in TRec is extracted as Rec, at step 721, and a determination made, at step 722, whether Rec is on the left hand side of Rule. If Rec is not on the left hand side of Rule, then the method returns to step 720. On the other hand, if Rec is on the left hand side of Rule, then the method proceeds to step 715.

A method 800 that bears some similarity to the method 500 illustrated in FIG. 5 takes advantage of a recommendation engine's prediction abilities, and is in FIG. 8. In this method 800, the "Apply a Rule" step 810 generates a recommendation value within the recommendation engine, rather than starting new items in the list with a neutral default recommendation value. This illustrates an advantage of this second embodiment, viz. the ability to transition seamlessly between the recommendation process and the item compatibility process.

Figure 9:
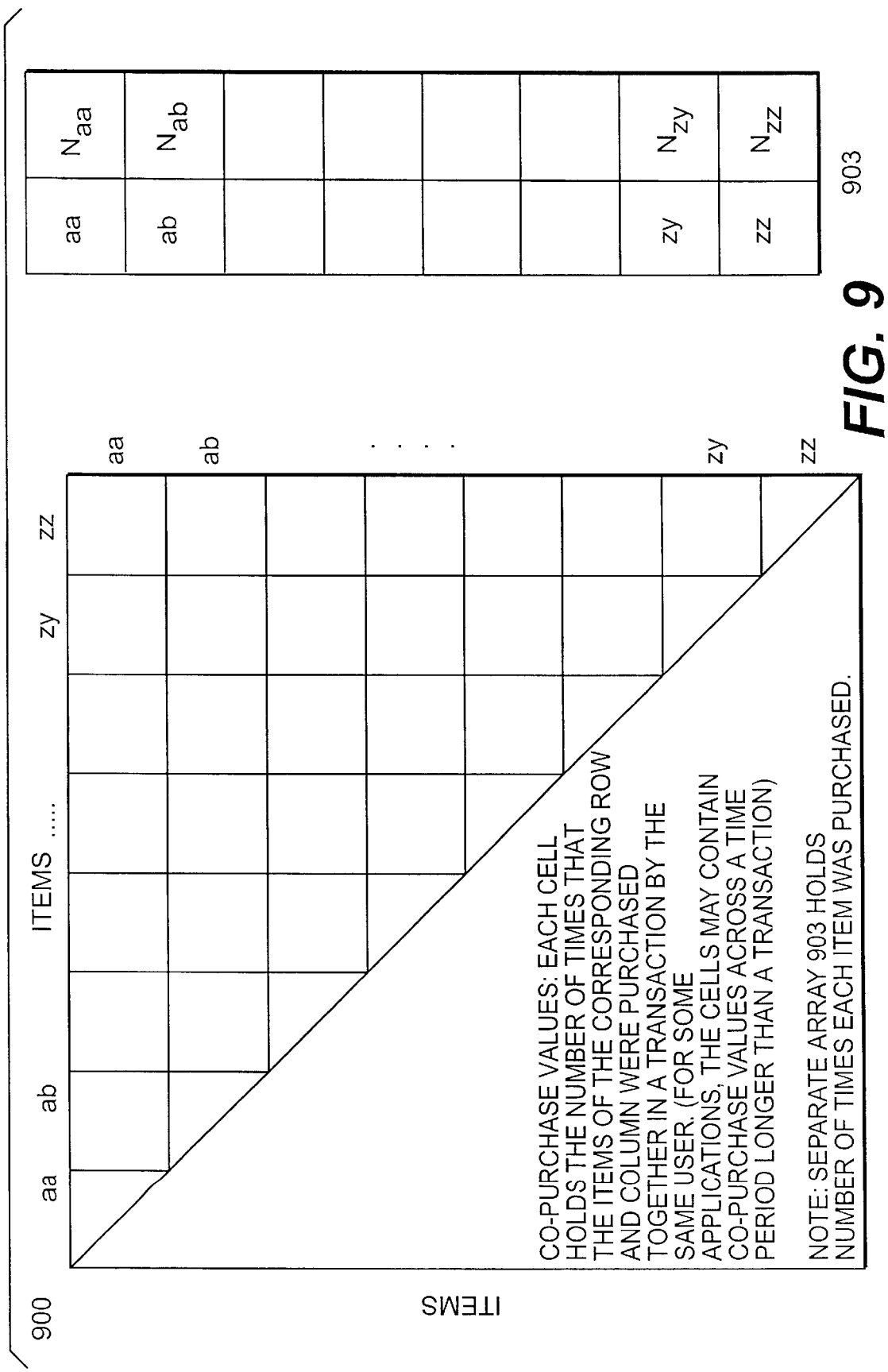
FIG. 9 illustrates data structures and methods for inferring item compatibility rules from purchase data.

FIG. 9 shows a data structure 900 and methods 901, 902 for inferring item compatibility rules in a recommendation engine. The data structure 900 is the upper right triangle of a two-dimensional array that maps items to items. In each cell of the array is stored the number of times that each pair of items was purchased together, either as part of a single transaction or as part of a longer-term customer relationship. This data is augmented by a simple array 903 that stores the total number of transactions, $N_{aa}$, $N_{ab}$, . . . $N_{zz}$ (or relationships) in which each item, aa, ab, . . . zz, was purchased.

The substitute rule inference method 901 finds pairs of items such that one item is generally not purchased when the other is purchased. It has two operating thresholds, one for the maximum co-purchase percentage and another for the number of purchases needed to judge accurately. The maximum percentage (SubThreshold) identifies when items are likely not to be substitutes. The number of purchases (SubSignifThreshold) is an estimate of confidence. For example, we may decide that groceries require a maximum co-purchase percentage of 1% and a minimum of 10,000 purchases to judge accurately. If, for example, we are testing skim milk against whole milk, and skim milk was purchased 20,000 times, whole milk was purchased 15,000 times, and they were purchased together 175 times, we would conclude as follows:

1. When people buy skim milk, they generally don't buy whole milk (175/20,000<0.01) and with 20,000 examples of buying skim milk, we confidently infer the rule "skim milk→NOT whole milk".
2. When people buy whole milk, they buy skim milk often enough to prevent a rule (175/15,000>0.01).

The complement rule inference method 902 finds pairs of items such that one item is generally purchased when the other is purchased. It has two operating thresholds, one for the minimum co-purchase percentage and another for the number of purchases needed to judge accurately. The minimum percentage (CompThreshold) identifies when items are likely not to be complements. The number of purchases (CompSignifThreshold) is an estimate of confidence. For example, we may decide that groceries require a minimum co-purchase percentage of 50% and a minimum of 10,000 purchases to judge accurately. If, for example, we are looking at the correlation between purchases of breakfast cereal and milk, and milk was purchased 20,000 times, while cereal was purchased 15,000 times, and they were purchased together 8,000 times, we would conclude as follows:

1. When people buy cereal, they generally buy milk (8,000/15,000>0.5) and with 15,000 examples of buying milk, we confidently infer the rule "cereal→milk".
2. When people buy milk, they also buy cereal sufficiently infrequently that we are prevented from inferring a rule (8,000/20,000>0.5).

Alternative implementations of these algorithms can use basic statistical methods to vary the number of items needed for confidence. In this case, the parameter used is the desired probability of correctness. Also, while the example uses language of purchases, the algorithms and data structures can learn from non-purchase behavioral data including but not limited to reading items, evaluating items, and rating items.

The present invention is not restricted to operating on a single processor system. In the embodiments of the invention described herein, each process may reside wholly within a single processor or be distributed among multiple processors. For example, the recommendation engine 608 may itself be resident on a single processor or distributed among several processors either for economic advantage, to achieve redundancy and higher availability, to achieve better performance, for geographic diversity, or for other reasons. Furthermore, each separate process may operate on the same processor(s), different processor(s), or an overlapping but different set of processors from each other process. For example, with regard to the embodiment illustrated in FIG. 2, an item compatibility rule input may be on a different processor from a compatibility modifier, but on the same processor as the historical set input, while the shopping set input may be split between the processor of the compatibility modifier and a third processor. In the case where more than one processor is used in the system, the processors are constructively, or operatively, coupled. Methods of such constructive coupling include, but are not limited to, connection through the internal bus of a multiprocessor computer, connection through shared computer memory or storage devices, connection on a local area network, connection on a wide area network, connection through as-needed communications such as modems and telephone lines, or connection through periodic data interchange such as transferring data on disks or tapes.

The present invention is useful in many different applications. For convenience, we refer to the output obtained from the two embodiments described above as "compatibility modified recommendations," to the first embodiment 200 as a "compatibility modifier for recommendations," and to the second embodiment 600 as a "compatibility aware recommendation engine." The use of the term "compatibility modified recommendations" is not intended to imply interest only in the output recommendation set, but rather to refer to the entire method that generates such output recommendation sets.

Figure 10:
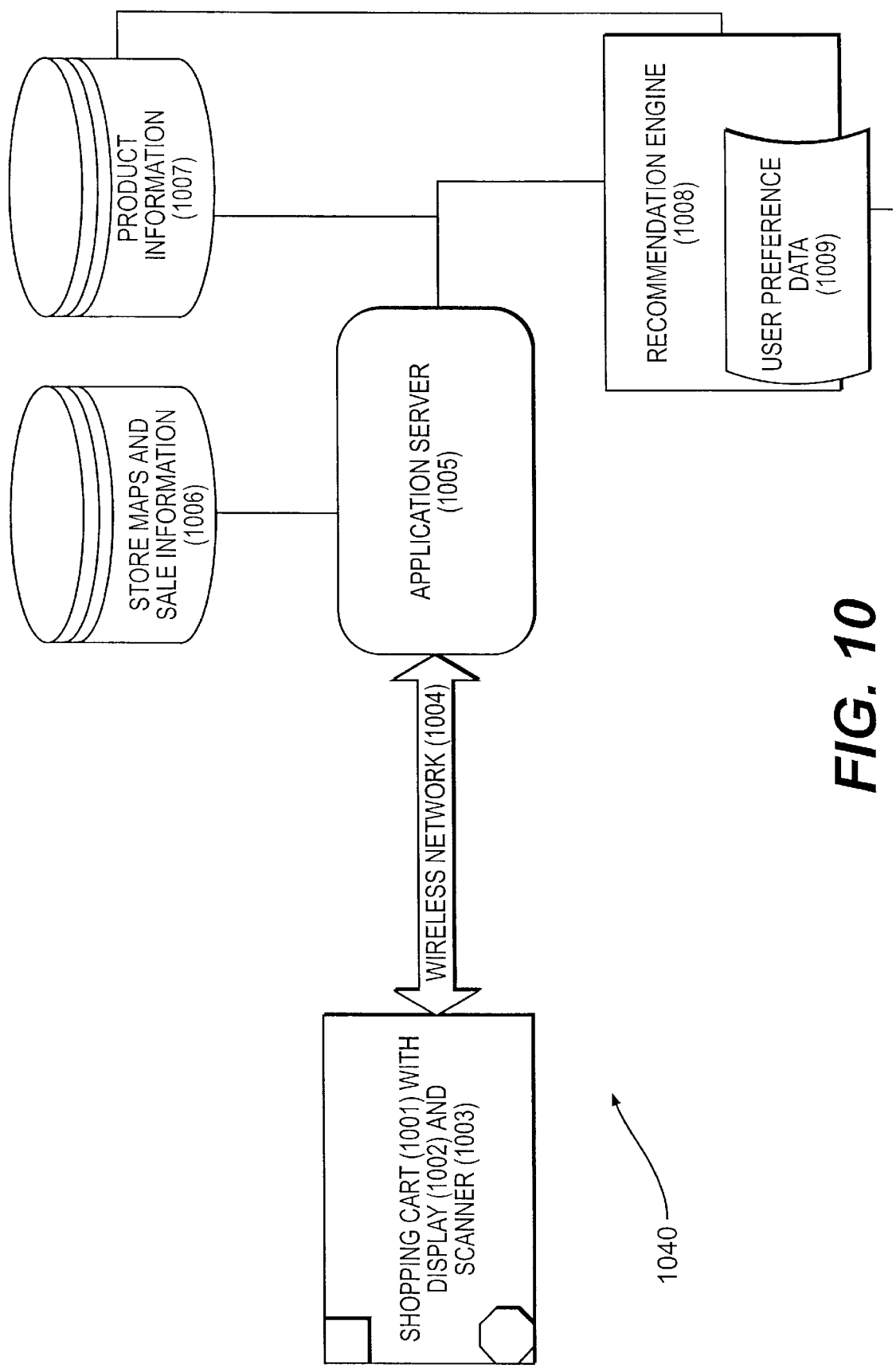
FIG. 10 illustrates two grocery store information systems, one not compatibility-aware, and the other including a compatibility-aware recommendation system.
Figure 10:
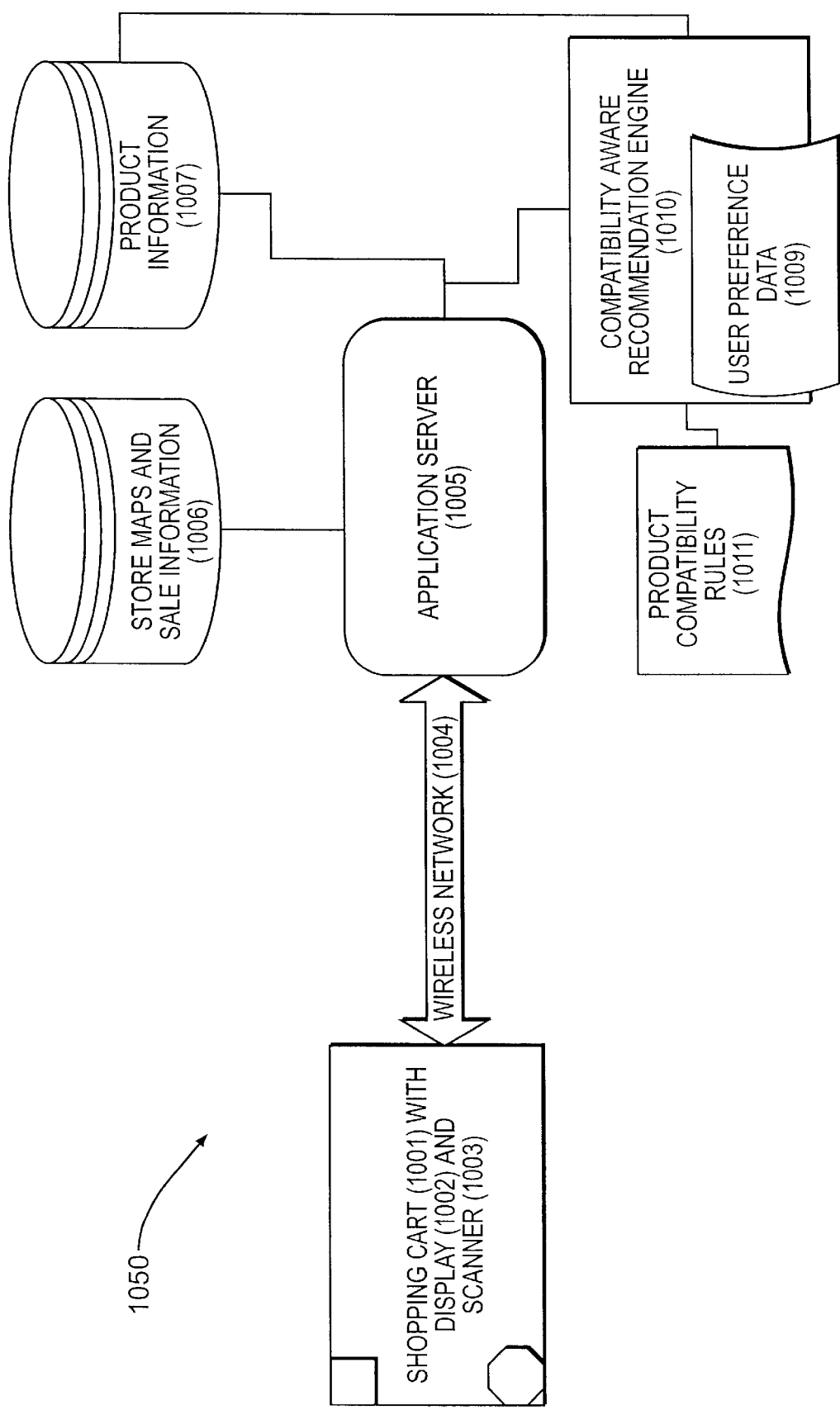

One way of developing an application that uses compatibility modified recommendations, a system designer or administrator identifies and connects the source of rules, determines whether the system will use shopping, historical, or match sets, and configures the recommendation system as it would be used without compatibility modification. The designer or administrator then substitutes the compatibility aware recommendation engine for an ordinary recommendation engine or adds a compatibility modifier for recommendations between the recommendation generation and its display to a user. FIG. 10 shows one embodiment of how these modifications may be made to an existing system. System 1040 is a non-compatibility-aware sales system for a grocery store, having a shopping cart 1001. A display 1002 and scanner 1003 on the shopping cart 1001 are operatively connected to an application server 1005 via a wireless network 1004. The application server 1005 is further connected to one or more memory units containing store maps and sales information 1006 and product information 1007. The application server 1005 is also connected to receive recommendations from a non-compatibility-aware recommendation engine 1008 that uses user preference data 1009 as an input. The user preference input 1009 may be gathered using any of the techniques discussed herein.

System 1050 is a compatibility-aware system, where the application server 1005 is connected to a compatibility-aware recommendation engine 1010, that uses as input user preference data 1009, product compatibility rules 1011, and product information from the product information memory 1007. The recommendations provided to the application server 1005 by the compatibility-aware recommendation engine 1010 are generated in accordance with the various compatibility rules 1011.

While each application has different requirements, we present two sample applications and also identify a larger number of applications of the invention. This set of examples is not intended to limit the applicability of the invention.

Figure 11:
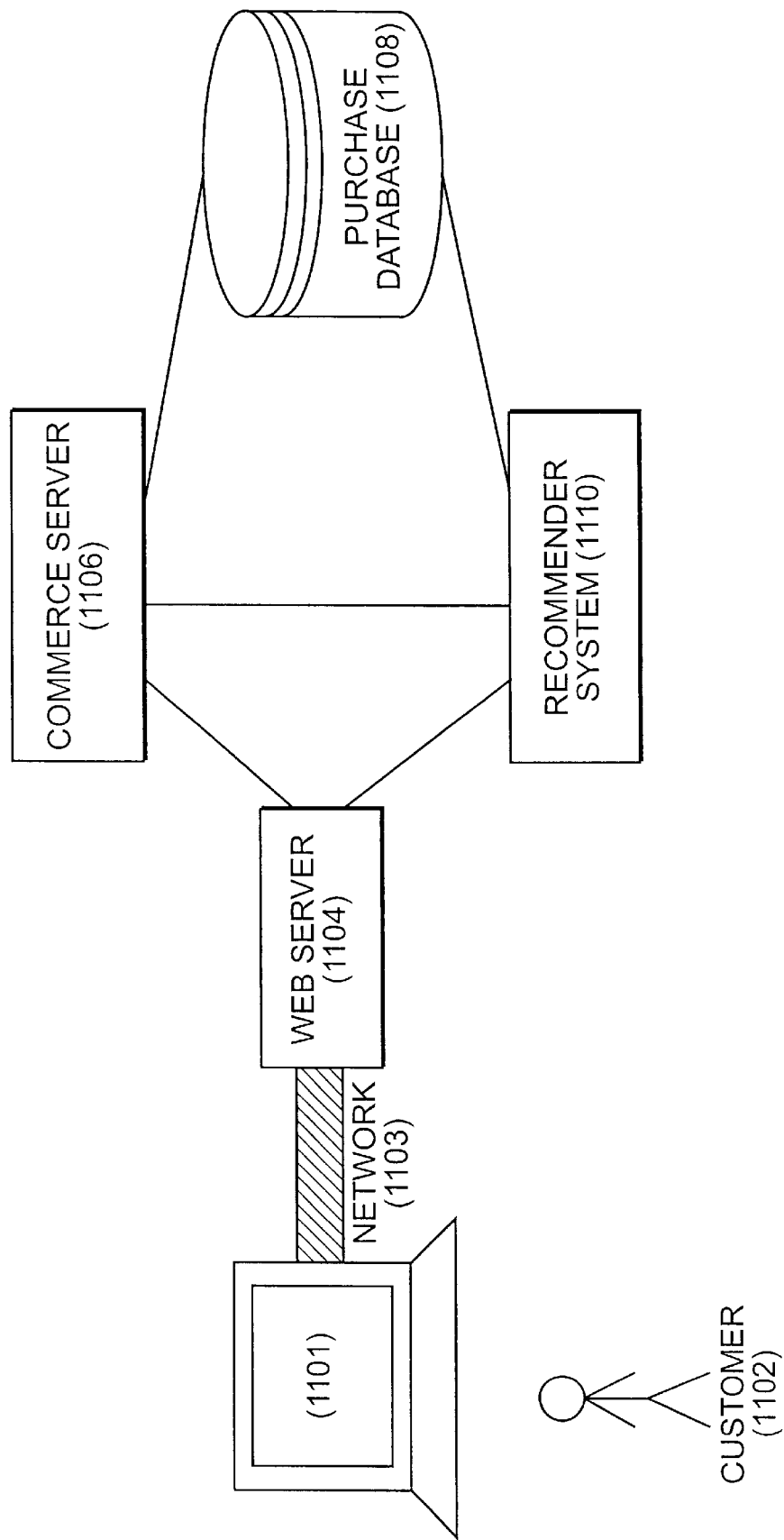
FIG. 11 illustrates an information system for a commerce center for performing electronic transactions.

First, the present invention may be extremely useful in electronic commerce applications on the Internet. FIG. 11 shows an illustration of a compatibility-aware recommendation engine 1110 in an electronic commerce application. The customer 1102 uses a web browser, for example on a personal computer 1101 to connect through a network 1101 to a web server 1104. The commerce server 1106, connected to the web server 1104, processes all financial transactions for the customer 1102 and contains a database of products for sale. The web server 1104 presents this set of products for sale to the customer 1102. A purchase database 1108, coupled to the commerce server 1106, contains records of previous purchases made by the customer 1102 and other customers.

A compatibility-aware recommendation engine 1101 is coupled to the web server 1104, the commerce server 1106, and the purchase database 1108. The recommendation engine 1101 may purchase data, e.g. implicit ratings, from the purchase database 1108 and may also receive explicit ratings from the customer 1110 via the web server 1104. The recommendation engine 1106 also receives match set information from the commerce server 1106, i.e. the current state of the market basket and any other relevant customer historical items. The recommendation engine 1110 receives requests from the web server 1104 and/or the commerce server 1106 for recommendations. These requests may focus on specific products or may be more general. The recommendation engine 1110 generates recommendations, using compatibility information, to ensure that the recommendations supplied are coherent and useful as a set and consistent with the user's current purchases.

There are many content domains within electronic commerce where a compatibility aware recommendation engine, or compatibility modified recommendations in general, would be useful. A specific example is an on-line bookstore. In this application, the commerce server contains a database of all books available for sale, indexed at least by ISBN, title, author, and subject. The commerce server also maintains a "shopping basket" of books that the user is currently planning to buy and a set of "recently purchased" books that the user has purchased within certain period of time, for example the past six months. The web server presents the user with various options for browsing books including viewing by topic, searching for books based on author, title, or ISBN, browsing best sellers, or simply asking for recommendations. Whenever a specific book or small set of books is sought, the web server can request recommendation scores from the compatibility aware recommendation engine for recommended books and present the recommendations to the user. These recommendation scores may be compatibility modified to help the user and the system identify books that match well with other purchases. When the user requests recommendations or a large set of books such as "fiction," the web server may ask the compatibility-aware recommendation engine for recommendations overall or within a category. The recommendation engine can then evaluate the books both on their own merits for the user, and as part of a set of books, and recommend a coherent set of books that is compatible with the other books selected by the user.

Another use of the recommendation engine is for the web server to request recommendations for books to advertise as part of the check-out process. The invention is advantageous because it prevents the system from recommending substitutes for current purchases and suggests books that complement the purchases.

Figure 12:
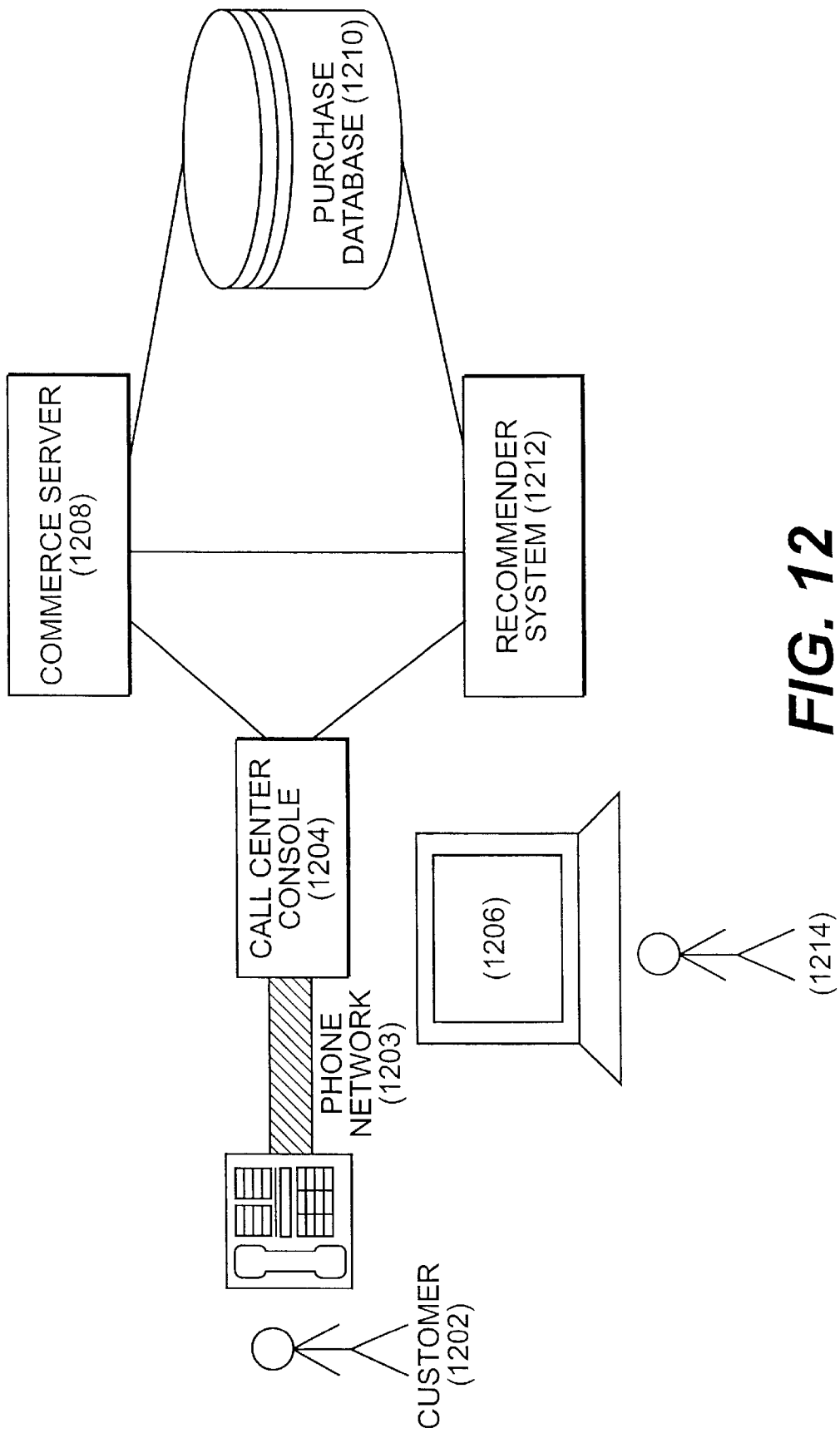
FIG. 12 illustrates an information system for a telephone call center.

A second illustrative application for such a system is to provide support for human sales staff in suggestive selling. In this application, depicted in FIG. 12, a sales agent 1214 uses an interface 1206 to a call center console 1204. The interface 1206 is used by the agent 1214 to enter product requests from the customer 1202. The call-center console 1204 is coupled to a commerce server 1208 that contains information regarding products on offer to the customer 1202, typically including pricing and availability. A purchase database 1210 is connected to the commerce server 1208 to record transactions with the customer 1202 and other customers. A recommendation engine 1212, either a recommendation engine having compatibility awareness integrated with the recommender, or having a compatibility modifier to modify recommendations, is coupled to the commerce server 1208 and the purchase database 1210. Compatibility-aware or compatibility-modified recommendations are generated by the recommender system 1212, and are updated to reflect each customer product request. the recommendations are displayed to the sales agent 1214 to help suggest other products for cross-selling. Depending on the business objectives of the marketer, the recommendations may be limited to a set of products that are featured, may span the inventory of the business, or may be restricted to products with specific attributes, for example products that are in-stock or have a high mark-up.

Figure 13:
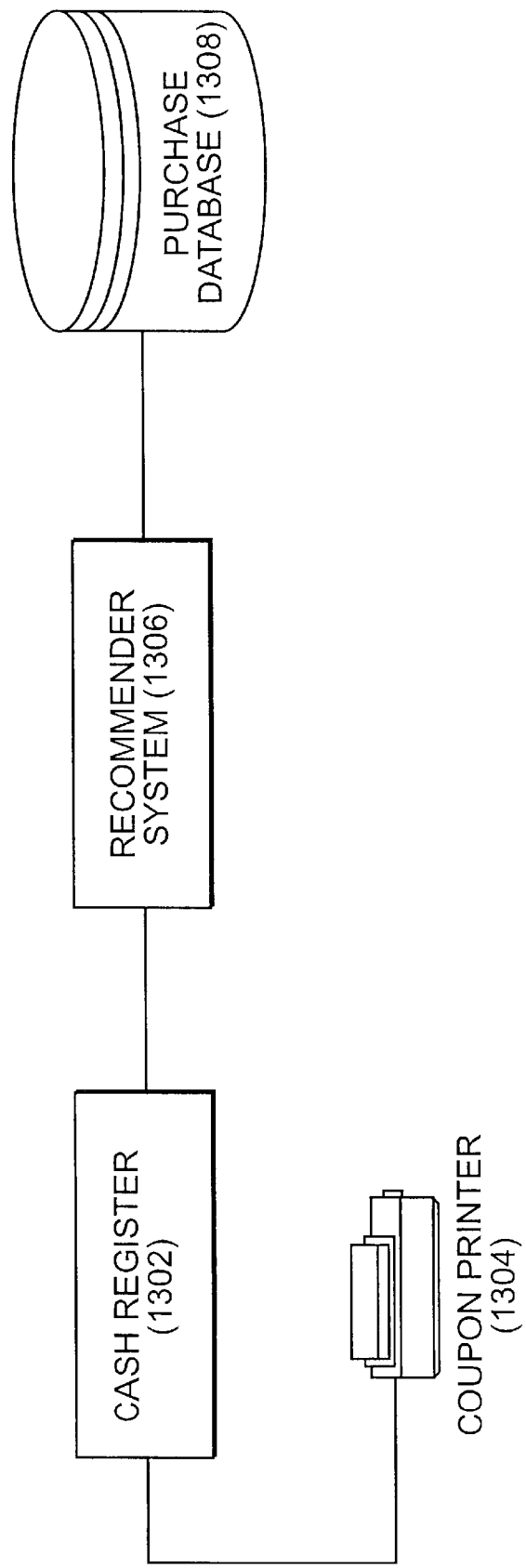
FIG. 13 illustrates an electronic system for use with a cash register.

Another example is illustrated in FIG. 13 that shows a cash-register check-out system. A cash register 1302 is connected to via a recommender system 1306 to a purchase database 1308. The recommender system 1306 suggests additional purchases to the customer while purchases are entered into the cash register 1302. An additional feature of the cash register check-out system is the ability to print a coupon compatible with current purchases using a coupon printer 1304; this coupon may induce the customer to return to make more purchases sooner than the customer would have returned without the coupon.

Many other content areas can similarly be enhanced by compatibility modified recommendations. Examples include music in various forms (e.g., sheet music, music recordings, music video recordings, and on-demand music systems including jukeboxes and cable-TV music request services), advertisements, marketing literature and product offers, consumable goods including groceries and office supplies, dining and entertainment services (e.g., arranging a set of dinner and/or theater reservations that complement each other), financial service products (e.g., recommending financial service products compatible with the customer's goals and portfolio), real estate and home furnishings, automobile-related goods and services, travel-related goods and services, media of various forms (e.g., audio, video, images), computer products and services, art works, publications and documents. In each of these areas, and many others, the benefit of compatibility modified recommendations is the added value to the customer and to the marketer when product recommendations are consistent with prior purchases, concurrent purchases, and each other.

Figure 14A:
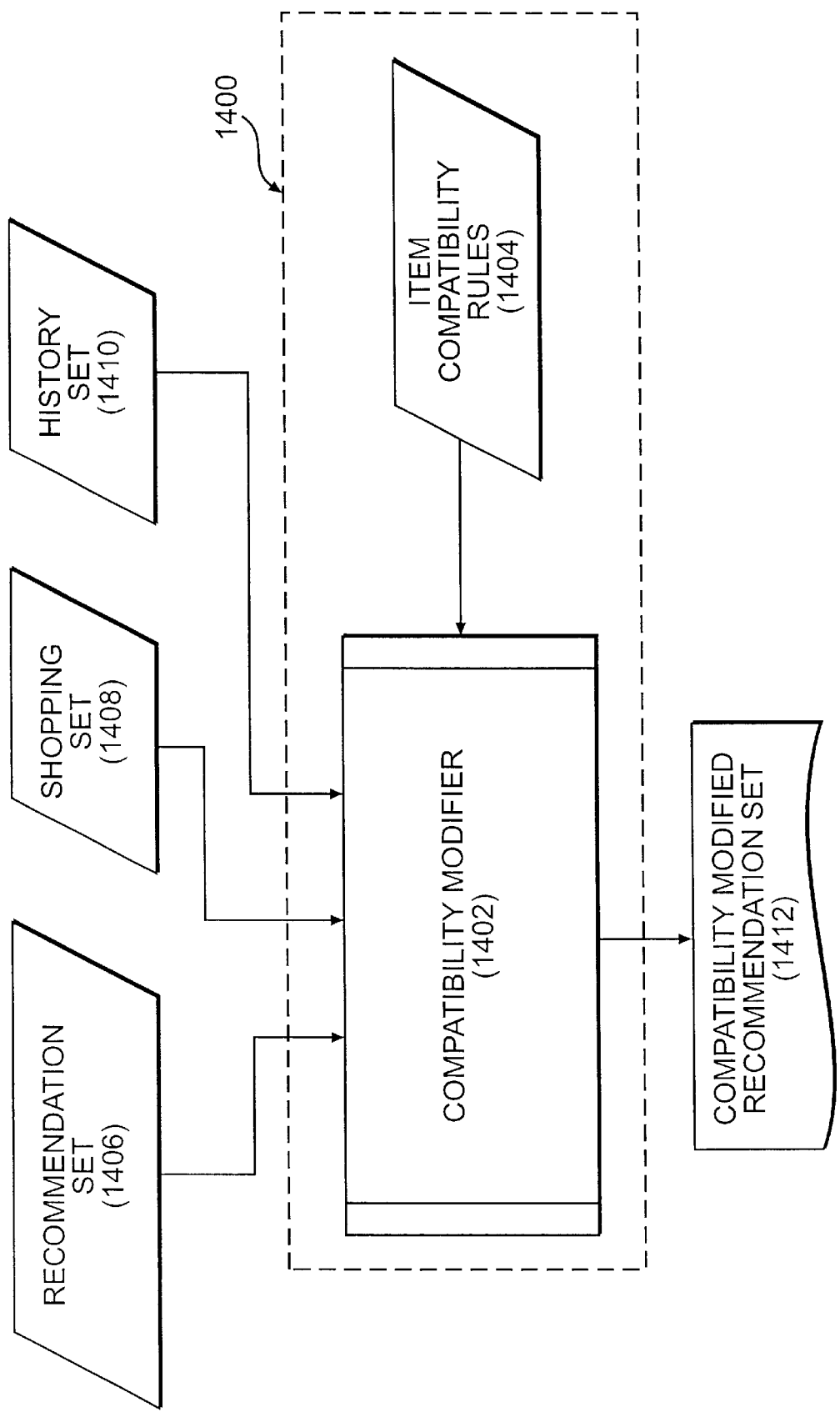
FIGS. 14A and 14B illustrate different processor configurations for a compatibility modifier.

Another embodiment of the invention, illustrated in FIG. 14A, includes a processor system 1400 configured to receive applicable data including i) item recommendations 1406, ii)a shopping set 1408 and iii) a history set 1410. The processing system is configured to produce a set of item compatibility rules 1404. The processing system 1400 is also configured to produce a compatibility-modified recommendation set 1412 using at least the item recommendations 1405 and the item compatibility rules 1404. The processor system 1400 may be a single processor for producing the compatibility rules and performing the compatibility modification.

Figure 14B:
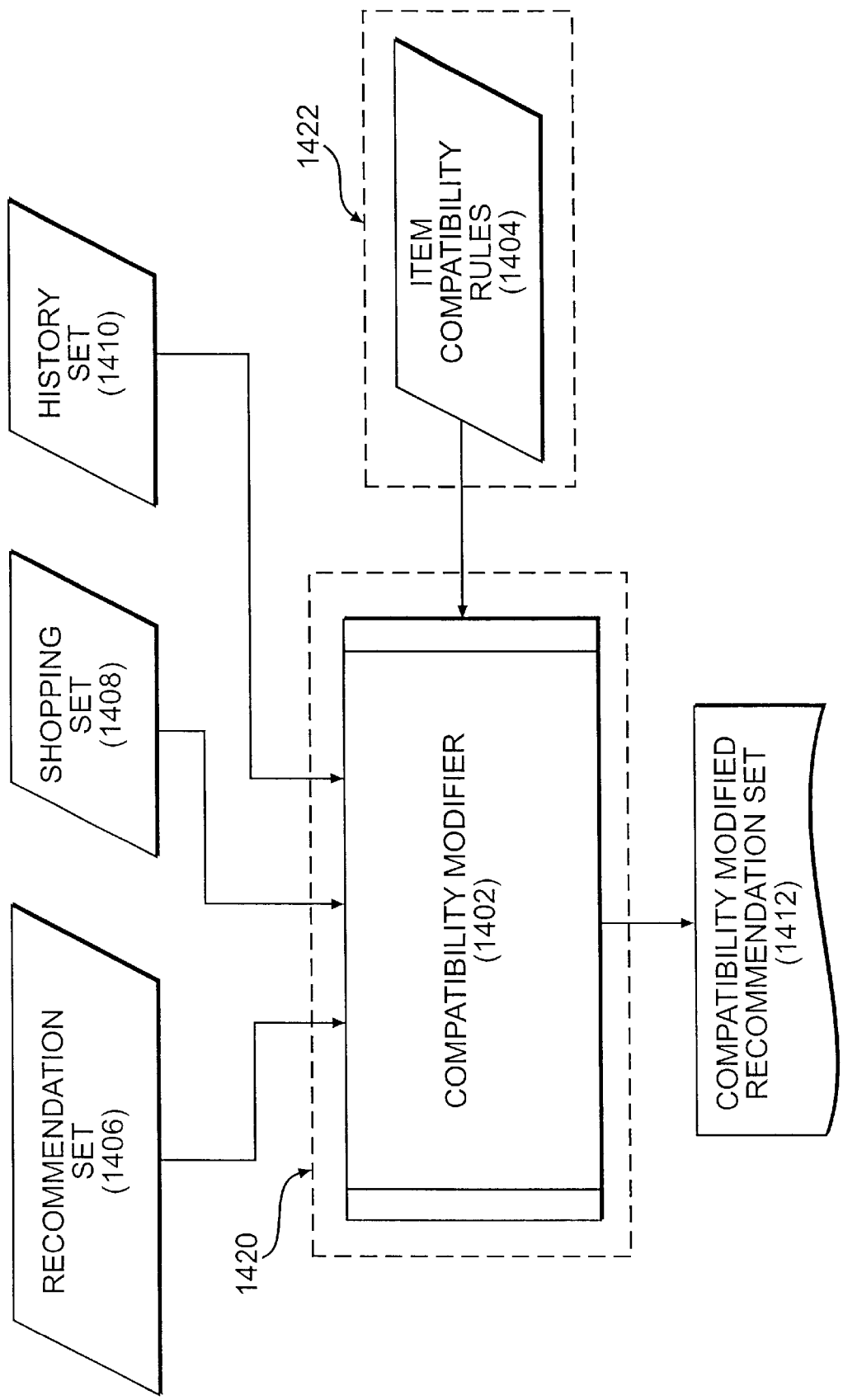

The processing system may also include a number of different processors. Another embodiment of a the processing system is illustrated in FIG. 14B, where the processing system includes a first processor 1420 (shown in dashed lines) configured to receive the recommendation set 1406, the shopping set 1408 and the history set 1410, and to modify the recommendations to become compatibility aware. A second processor 1422 (also in dashed lines) is operatively coupled to the first processor 1420 and is configured to produce the item compatibility rules 1404 and to direct the item compatibility rules to the first processor 1420. The second processor 1422 may be remote from the first processor 1420 and coupled to the first processor 1420 through a network, the Internet, or some other communications channel.

It will be appreciated that the compatibility-aware recommender system illustrated in FIG. 6 may be situated on processing system having a single processor, or a number of processors. For example, the recommendation process 608 may be on a first set of processors, including a single processor, while all other items, including the item compatibility rules 606, match set 602, rating storage 609, and other items, are all located on a second set of processors, including a single processor. In another example, the recommendation process 608 may be on a first set of processors, while all the other items, including the item compatibility rules 606, the match set 602, and the rating storage 609, are each located on, or associated with, their own separate, individual set of processors. It should be appreciated that where the term "set of processors" is used, the set may include only a single processor.

As noted above, the present invention is applicable to recommender systems. It is believed to be particularly useful in permitting recommender systems to produce recommendations that are not only accurate but also of high value to the user, i.e. recommendations are compatible with other purchases or recommendations. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An electronic processing system for generating a compatibility-aware recommendation output set to a user based, at least in part, on a set of item compatibility rules, the system comprising a processing system of one or more processors configured to:
- a. receive applicable data including
  - i. user preference data, and
  - ii. item compatibility rules, and
- b. produce a compatibility-aware recommendation output set using the user preference data and the item compatibility rules.

2. A system as recited in claim 1, wherein the processing system is further configured to
- a. receive match data, and
- b. produce the compatibility-aware recommendation output set, using the user preference data, the match data and the compatibility rules.

3. A system as recited in claim 1, further comprising a ratings interface operatively coupled to the processing system, to receive the user preference data and transmit the user preference data to the processing system.

4. A system as recited in claim 3, wherein
the ratings interface is further configured to receive user item preference data that includes at least one of unary values, binary values, and numerical values, and
the processing system is further configured to produce the compatibility-aware item recommendation set from the at least one of the unary values, binary values and numerical values.

5. A system as recited in 1, further comprising
a recommendation request interface operatively coupled to the processing system to receive a recommendation request from the user, and
wherein the processing system is configured to produce the compatibility-aware recommendation set in response to the recommendation request received from the user.

6. A system as recited in claim 1, further comprising
an output interface operatively coupled to the processing system in order to receive the compatibility-aware recommendation output set, and
a display device operatively coupled to the output interface in order to display the compatibility-aware recommendation output set.

7. A system as recited in claim 1, wherein the processing system is further configured to derive the item compatibility rules from one or more of:
- a. a marketer specification,
- b. automatic generation using machine learning,
- c. automatic generation using a genetic algorithm,
- d. automatic generation using a neural network,
- e. automatic generation using a rule inference system,
- f. data mining,
- g. an analysis of historical purchase and preference data, and
- h. a user specification.

8. A system as recited in claim 1, wherein the processing system is further configured to receive the item compatibility rules represented as at least one of:
- a. unidirectional rules,
- b. bidirectional rules,
- c. generalized rules including multi-way rules,
- d. rules among items,
- e. rules among sets,
- f. rules among collections,
- g. rules with weight factors,
- h. rules with priorities, and
- i. unweighted and unprioritized rules.

9. A system as recited in claim 1, wherein the processing system is further configured to
- a. determine whether a match set exists,
- b. identify items compatible with items in the match set when the match set is determined to exist, where the items compatible with items in the match set are not substitutes for items in the match set,
- c. obtain recommendation scores for the identified items,
- d. recommend to the user a subset of the identified compatible items that includes no items that are substitutes for other items in the subset.

10. A system as recited in claim 9, further configured to present recommended compatible items in the subset to the user with an indicator of recommendation strength for the items in the subset.

11. A system as recited in claim 1, wherein the processing system is further configured to:
- a. initialize the compatibility-aware recommendation set,
- b. determine whether a match set exists,
- c. for each particular item in the match set, when the match set is determined to exist, apply rules having the particular item in the match set on the rules' inputs, and add items to the compatibility-aware recommendation set and subtract items from the compatibility-aware recommendation set when the applied rules so determine,
- d. sort items in the compatibility-aware recommendation output set according to recommendation value,
- e. for each examined item whose recommendation score exceeds a recommendation value, select a first sub-set of rules whose inputs include the examined item,
- f. select a second sub-set of rules from the first sub-set of rules where rules in the second sub-set have outputs with items not appearing above the examined item in the compatibility-aware output set,
- g. apply the rules in the second sub-set,
- h. sort items in the compatibility-aware recommendation output set below the examined item according to recommendation score, and
- i. sort all items in the compatibility-aware recommendation output set according to recommendation score.

12. A system as recited in claim 11, wherein applying a rule to a selected item includes
examining a rule having the selected item on an input to the rule,
adding an item on an output of the rule to the compatibility-aware recommendation output set where the item on output of the rule is not already in the compatibility-aware recommendation output set, and applying a neutral recommendation score to the added item, and
adding a recommendation score modifier to a recommendation score for all items on the output of the rule.

13. A system as claimed in claim 1, further configured to:
- a. determine that a first and a second item have each been selected a number of times that is greater than a selection threshold,
- b. determine the number of times the first item has been selected by the user when the user has selected the second item, and c. compare, for one of the first and second items, the number of times that the one of the first and second items has been selected at the same time as the other of the first and second items, with the total number of times the one of the first and second items has been selected to produce a coincidence indicator, and d. infer a substitute rule between the two items when the coincidence indicator indicates coincident selection of the first and second items at a level below a substitute threshold level.

14. A system as claimed in claim 1, further configured to:

a. determine that a first and a second item have each been selected a number of times that is greater than a selection threshold, b. determine the number of times the first item has been selected by the user when the user has selected the second item, and c. compare, for one of the first and second items, the number of times that the one of the first and second items has been selected at the same time as the other of the first and second items, with the total number of times the one of the first and second items has been selected to produce a coincidence indicator; and d. infer a complementary rule between the two items when the coincidence indicator indicates coincident selection of the first and second items at a level above a coincidence threshold level.

15. A system as recited in claim 1, wherein the processing system is further configured to produce the compatibility-ware recommendation output set under real-time, interactive time-constraints.

16. A system as recited in claim 1, wherein the processing system is further configured to produce the compatibility-aware recommendation output set as at least one of unary, unordered and priority-ordered recommendations.

17. A system as recited in claim 1, wherein the processing system includes a first set of processors configured to a. receive the applicable data including
i. the user preference data, and
ii. the item compatibility rules, and b. produce the compatibility-aware recommendation output set using the user preference data and the item compatibility rules.

18. A system as recited in claim 1, wherein the processing system includes a. a first set of processors configured to receive the user preference data, b. a second set of processors configured to receive the item compatibility rules, and c. a third set of processors operatively coupled to the first and second sets of processors to receive the user preference data and the item compatibility respectively therefrom and configured to produce the compatibility-aware recommendation output set using the user preference data and the item compatibility rules.

19. A system as recited in claim 1, wherein the processing system includes a. a first set of processors configured to receive the user preference data, and b. a second set of processors operatively coupled to the first set of processors to receive the user preference data from the first set of processors, and configured to
i) receive the item compatibility rules, and
ii) produce the compatibility-aware recommendation output set using the user preference data and the item compatibility rules.

20. A method of producing a compatibility filtered and weighted recommendation to a user, the method using a computer having a processing system having one or more processors and an input/output interface, the method comprising:

a. receiving applicable data, using the processing system, including
i. user preference data, and
ii. item compatibility rules, and b. producing, using the processing system, a compatibility-aware recommendation output set using the user preference data and the item compatibility rules.

21. A method as recited in claim 20, further comprising a. receiving match data, using the processing system, and b. producing, using the processing system, the compatibility-aware recommendation output set using the user preference data, the match data and the compatibility rules.

22. A method as recited in claim 20, further comprising receiving the user preference data by the interface and transmitting the user preference data to the processing system.

23. A method as recited in claim 22, further comprising receiving, using the interface, user item preference data that includes at least one of unary values, binary values, and numerical values, and producing the compatibility-aware item recommendation set, using the processing system, from the at least one of the unary values, binary values and numerical values.

24. A method as recited in 20, further comprising receiving a recommendation request from the user via the interface, and producing, using the processing system, the compatibility-aware recommendation set in response to the recommendation request received from the user.

25. A method as recited in claim 20, further comprising outputting the compatibility aware recommendation set to a display device via the input/output interface.

26. A method as recited in claim 20, further comprising deriving, using the processor system, the item compatibility rules from one or more of:

a. a marketer specification, b. automatic generation using machine learning, c. automatic generation using a genetic algorithm, d. automatic generation using a neural network, e. automatic generation using a rule inference system, f. data mining, g. an analysis of historical purchase and preference data, and h. a user specification.

27. A system as recited in claim 20, further comprising receiving, using the processing system, the item compatibility rules represented as at least one of:

a. unidirectional rules, b. bidirectional rules, c. generalized rules including multi-way rules, d. rules among items, e. rules among sets, f. rules among collections, g. rules with weight factors, h. rules with priorities, and i. unweighted and unprioritized rules.

28. A method as recited in claim 20, further comprising a. determining, using the processing system, whether a match set exists, b. identifying items compatible with items in the match set when the match set is determined to exist, where the items compatible with items in the match set are not substitutes for items in the match set, using the processing system, c. obtaining recommendation scores for the identified items, using the processing system, and d. recommending to the user, using the processing system, a subset of the identified compatible items that includes no items that are substitutes for other items in the subset.

29. A method as recited in claim 28, further comprising presenting recommended compatible items in the subset to the user with an indicator of recommendation strength for the items in the subset, using the processing system.

30. A method as recited in claim 20, further comprising a. initializing the compatibility-aware recommendation set, using the processing system, b. determining, using the processing system, whether a match set exists, c. for each particular item in the match set, when the match set is determined to exist, applying rules having the particular item in the match set on the rules' inputs, and adding items to the compatibility-aware recommendation set and subtracting items from the compatibility-aware recommendation set when the applied rules so determine, using the processing system, d. sorting, using the processing system, items in the compatibility-aware recommendation output set according to recommendation value, e. for each examined item whose recommendation score exceeds a recommendation value, selecting a first sub-set of rules whose inputs include the examined item, using the processing system, f. selecting, using the processing system, a second sub-set of rules from the first sub-set of rules where rules in the second sub-set have outputs with items not appearing above the examined item in the compatibility-aware output set, g. applying the rules in the second sub-set, using the processing system, h. sorting, using the processing system, items in the compatibility-aware recommendation output set below the examined item according to recommendation score, and i. sorting all items in the compatibility-aware recommendation output set according to recommendation score, using the processing system.

31. A method as recited in claim 30, wherein applying a rule to a selected item includes examining a rule having the selected item on an input to the rule, using the processing system, adding an item on an output of the rule to the compatibility-aware recommendation output set where the item on the output of the rule is not already in the compatibility-aware recommendation output set, and applying a neutral recommendation score to the added item, using the processing system, and adding a recommendation score modifier to a recommendation score for all items on the output of the rule, using the processing system.

32. A method as claimed in claim 20, further comprising a. determining, using the processing system, that a first and a second item have each been selected a number of times that is greater than a selection threshold, b. determining, using the processing system, the number of times the first item has been selected by the user when the user has selected the second item, c. comparing, for one of the first and second items, the number of times that the one of the first and second items has been selected at the same time as the other of the first and second items, with the total number of times the one of the first and second items has been selected to produce a coincidence indicator, using the processing system, and d. inferring a substitute rule, using the processing system, between the two items when the coincidence indicator indicates coincident selection of the first and second items at a level below a substitute threshold level.

33. A method as claimed in claim 20, further comprising a. determining, using the processing system, that a first and a second item have each been selected a number of times that is greater than a selection threshold, b. determining, using the processing system, the number of times the first item has been selected by the user when the user has selected the second item, c. comparing, for one of the first and second items, the number of times that the one of the first and second items has been selected at the same time as the other of the first and second items, with the total number of times the one of the first and second items has been selected to produce a coincidence indicator, using the processing system, and d. inferring a complementary rule, using the processing system, between the two items when the coincidence indicator indicates coincident selection of the first and second items at a level above a coincidence threshold level.

34. A method as recited in claim 20, further comprising producing the compatibility-aware recommendation output set under real-time, interactive time-constraints, using the processing system.

35. A method as recited in claim 20, further comprising producing, using the processing system, the compatibility-aware recommendation output set as at least one of unary, unordered and priority-ordered recommendations.

36. A method as recited in claim 20, wherein the processing system includes a first set of processors, and further comprising a. receiving, with the first set of processors, the applicable data including i. the user preference data, and ii. the item compatibility rules, and b. producing, with the first set of processors, the compatibility-aware recommendation output set using the user preference data and the item compatibility rules.

37. A method system as recited in claim 20, wherein the processing system includes first, second and third sets of processors operatively coupled together, and further comprising a. receiving the user preference data using the first set of processors, b. receiving the item compatibility rules using the second set of processors, and c. receiving, using the third set of processors, the user preference data and the item compatibility respectively from the first and second sets of processors, and producing the compatibility-aware recommendation output set using the user preference data and the item compatibility rules.

38. A method as recited in claim 20, wherein the processing system includes first and second sets of operatively coupled processors, and further comprising a. receiving the user preference data using the first set of processors and b. receiving, using the second set of processors, the user preference data from the first set of processors, and
  i) receiving, using the second set of processors, the item compatibility rules, and
  ii) producing, using the second set of processors, the compatibility-aware recommendation output set using the user preference data and the item compatibility rules.

39. A computer-readable program storage device, having a set of program instructions physically embodied thereon, executable by a computer, to perform a method of producing a compatibility-aware recommendation, the method comprising:

a. receiving applicable data including
  i. user preference data, and
  ii. item compatibility rules, and b. producing a compatibility-aware recommendation output set using the user preference data and the item compatibility rules.

40. A storage device as recited in claim 39, the method further comprising a. receiving match data; and b. producing the compatibility-aware recommendation output set, using the user preference data, the match data and the compatibility rules.

41. A storage device as recited in 39, further comprising receiving a recommendation request from the user and producing the compatibility-aware recommendation set in response to the recommendation request received from the user.

42. A storage device as recited in claim 39, further comprising receiving the compatibility-aware recommendation output set, and displaying the compatibility-aware recommendation output set to the user.

* * * * *

UNITED STATES PATENT AND TRADEMARK OFFICE
CERTIFICATE OF CORRECTION

PATENT NO.        : 6,412,012 B1                                    Page 1 of 1
APPLICATION NO.   : 09/219585
DATED             : June 25, 2002
INVENTOR(S)       : Bieganski et al.

It is certified that error appears in the above-identified patent and that said Letters Patent is hereby corrected as shown below:

On the Title Page and Col. 1, lines 1-4,

Title should read: "System, Method, and Article of Manufacture for Making a Compatibility-Aware Recommendations to a User" should read -- System, Method, and Article of Manufacture for Making Compatibility-Aware Recommendations to a User --.

Signed and Sealed this
Twelfth Day of April, 2011

David J. Kappos
*Director of the United States Patent and Trademark Office*